US011425363B2

(12) United States Patent
Appelgate et al.

(10) Patent No.: US 11,425,363 B2
(45) Date of Patent: Aug. 23, 2022

(54) SYSTEM AND METHOD FOR GENERATING LIGHT FIELD IMAGES

(71) Applicant: Looking Glass Factory, Inc., Brooklyn, NY (US)

(72) Inventors: Kyle Appelgate, Brooklyn, NY (US); Evan Kahn, Brooklyn, NY (US); Alexis Hornstein, Brooklyn, NY (US); Shawn Michael Frayne, Brooklyn, NY (US); Matthew Collins, Brooklyn, NY (US); Char Stiles, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/226,404

(22) Filed: Apr. 9, 2021

(65) Prior Publication Data

US 2021/0321081 A1    Oct. 14, 2021

Related U.S. Application Data

(60) Provisional application No. 63/120,007, filed on Dec. 1, 2020, provisional application No. 63/007,605, filed on Apr. 9, 2020.

(51) Int. Cl.
| | |
|---|---|
| *H04N 13/351* | (2018.01) |
| *H04N 13/302* | (2018.01) |
| *G06T 3/40* | (2006.01) |
| *H04N 13/15* | (2018.05) |
| *G03H 1/26* | (2006.01) |
| *G03H 1/00* | (2006.01) |
| *H04N 13/161* | (2018.01) |
| *H04N 19/597* | (2014.01) |

(52) U.S. Cl.
CPC ......... *H04N 13/351* (2018.05); *G03H 1/0005* (2013.01); *G03H 1/26* (2013.01); *G06T 3/4038* (2013.01); *H04N 13/15* (2018.05); *H04N 13/161* (2018.05); *H04N 13/302* (2018.05); *H04N 19/597* (2014.11); *G03H 2001/0088* (2013.01)

(58) Field of Classification Search
CPC .. H04N 13/351; H04N 19/597; H04N 13/161; H04N 13/15; H04N 13/302; G06T 3/4038; G03H 1/26; G03H 1/0005; G03H 2001/0088
USPC .......................................................... 348/41
See application file for complete search history.

(56) References Cited

U.S. PATENT DOCUMENTS

| | | | |
|---|---|---|---|
| 5,012,274 A | 4/1991 | Dolgoff | |
| 6,377,702 B1 | 4/2002 | Cooper | |
| 6,847,396 B1 | 1/2005 | Lin | |
| 10,855,965 B1 * | 12/2020 | Jiao | H04N 13/156 |
| 10,893,262 B2 | 1/2021 | Vetter et al. | |
| 2010/0026712 A1 * | 2/2010 | Aliprandi | G06T 15/20 |
| | | | 345/629 |
| 2011/0187563 A1 | 8/2011 | Sanders-Reed | |

(Continued)

OTHER PUBLICATIONS

International Search Report and Written Opinion for Application No. PCT/US21/026545 dated Jul. 14, 2021.

(Continued)

*Primary Examiner* — Tung T Vo
(74) *Attorney, Agent, or Firm* — Jeffrey Schox; Diana Lin

(57) ABSTRACT

A system and method can include receiving a set of views, encoding the set of views, and displaying the set of views such that they are perceived as a holographic image.

14 Claims, 12 Drawing Sheets

(56) References Cited

U.S. PATENT DOCUMENTS

| | | | |
|---|---|---|---|
| 2012/0051631 | A1 | 3/2012 | Nguyen et al. |
| 2013/0336599 | A1 | 12/2013 | Richards et al. |
| 2014/0198030 | A1 | 7/2014 | Takazawa |
| 2016/0088287 | A1 | 3/2016 | Sadi et al. |
| 2016/0105658 | A1 | 4/2016 | Choo et al. |
| 2016/0187850 | A1 | 6/2016 | Oh |
| 2018/0063519 | A1* | 3/2018 | Smithwick ........... H04N 13/398 |
| 2018/0288387 | A1* | 10/2018 | Somanath ............ H04N 13/128 |
| 2019/0011621 | A1* | 1/2019 | Karafin ................ G03H 1/2202 |
| 2019/0219832 | A1* | 7/2019 | Yang ...................... H04N 13/10 |
| 2019/0253697 | A1* | 8/2019 | Kim ..................... H04N 13/351 |
| 2021/0055690 | A1* | 2/2021 | Kim ..................... G03H 1/2294 |

OTHER PUBLICATIONS

"High efficiency video coding", International Telecommunication Union, Nov. 2019.

"Light Field Capture and Distribution Update From Display Summit 2018", Display Daily, published Apr. 2019, https://www.displaydaily.com/paid-news/ldm-mdm/ldm-mdm-event-reports/ldmmdm-event-round-up/light-field-capture-and-distribution-update-from-display-summit-2018.

Bao, Wenbo, et al., "Depth-Aware Video Frame Interpolation", arXiv:1904.00830v1, Apr. 1, 2019.

Bourbakis, N., et al., "Picture Data Encryption Using Scan Patterns", Pattern Recognition, vol. 25, No. 6, pp. 567-581, 1992.

Eden, Murray, et al., "Polynomial Representation of Pictures", Signal Processing 10 (1986) 385-393, received Oct. 24, 1984.

Wu, Gaochang, et al., "Light Field Image Processing: An Overview", Article in IEEE Journal of Selected Topics in Signal Processing—Aug. 2017.

Yu, Zhan, "Light Field Imaging", Dissertation submitted to the Faculty of the University of Delaware, Fall 2013.

* cited by examiner

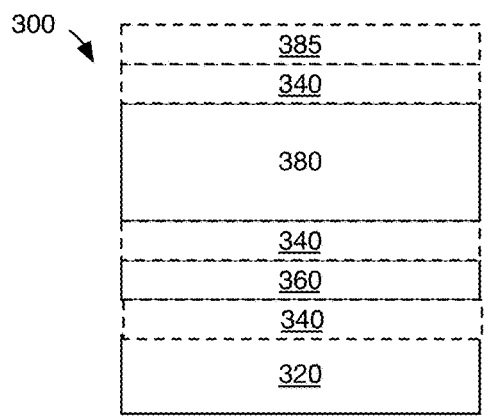
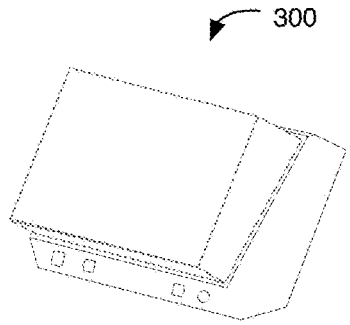
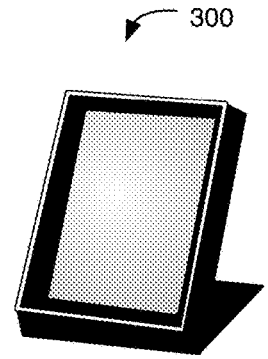
Figure 3A          Figure 3B          Figure 3C
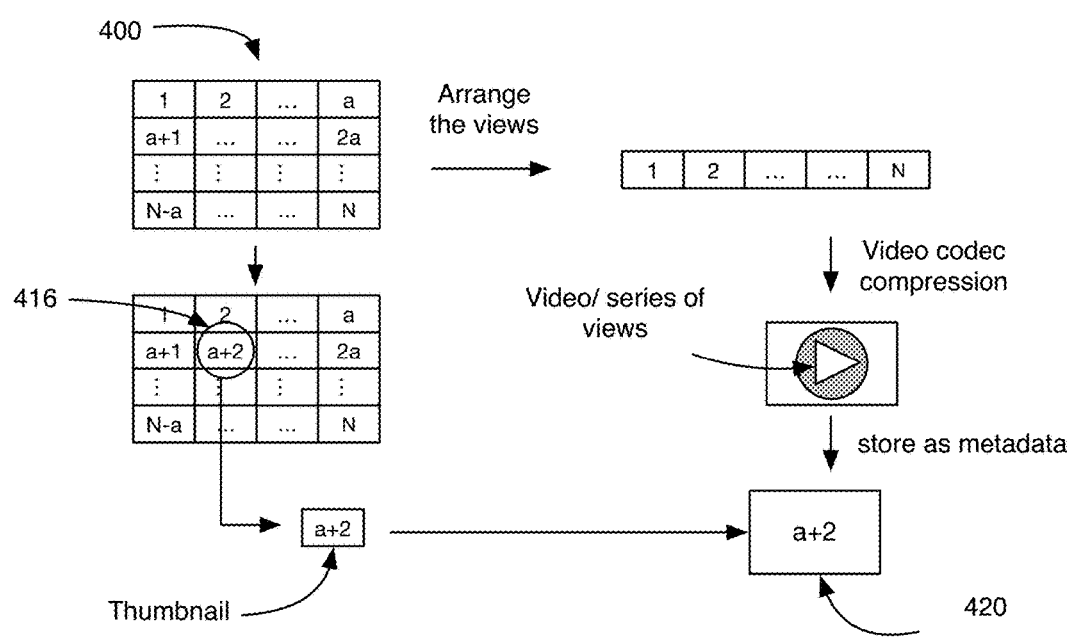
Figure 4

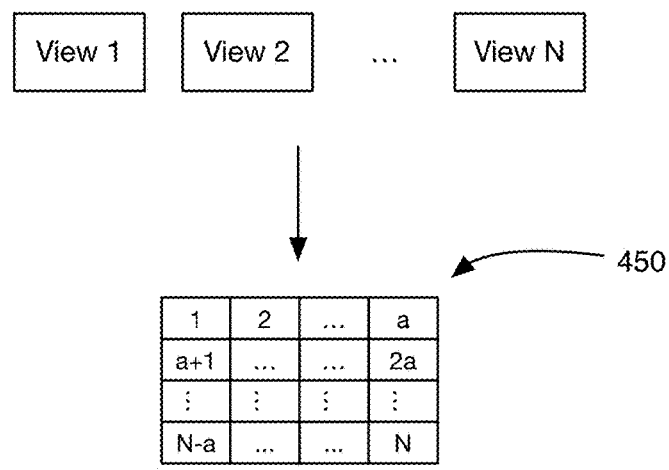
FIGURE 12
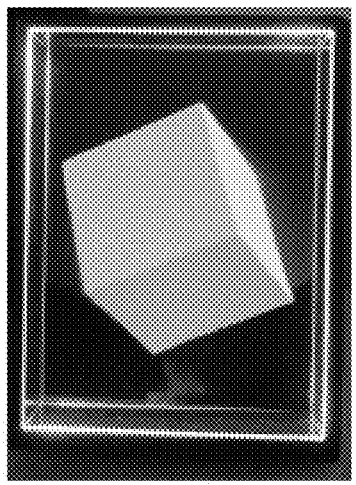 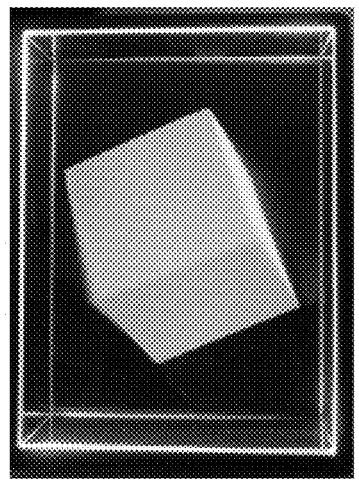 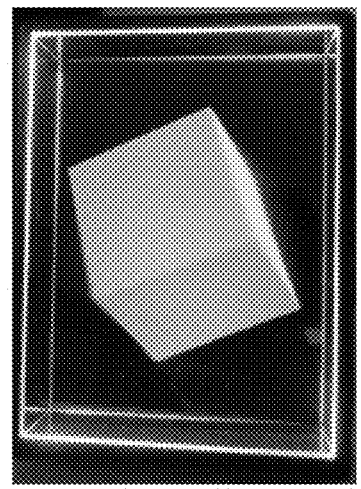
FIGURE 13A FIGURE 13B FIGURE 13C

SYSTEM AND METHOD FOR GENERATING LIGHT FIELD IMAGES

CROSS-REFERENCE TO RELATED APPLICATIONS

This application claims the benefit of U.S. Provisional Application No. 63/007,605, filed 9 Apr. 2020 and U.S. Provision Application No. 63/120,007, filed 1 Dec. 2020, each of which is incorporated in its entirety by this reference.

TECHNICAL FIELD

This invention relates generally to the light field imaging field, and more specifically to a new and useful system and method in the light field imaging field.

BACKGROUND

Light field images are often generated using a plurality of images of a scene taken from different perspectives. To generate high quality light field images, many images and/or high resolution images can be required. This can lead to very large data structures which can be slow to render, display, process, and/or transmit.

Thus, there is a need in the light field imaging field to create a new and useful system and method. This invention provides such new and useful system and method.

BRIEF DESCRIPTION OF THE FIGURES

FIGS. 3A, 3B and 3C are schematic representations of example displays.

FIG. 4 is a schematic representation of an example of generating a light field image, where the light field image is stored as a video that can be stored as metadata.

FIG. 12 is a schematic representation of an example of a quilt image.

FIG. 13A is an image of an example of a displayed lightfield image that is uncompressed.

FIG. 13B is an image of an example of a displayed lightfield image that is compressed.

FIG. 13C is an image of an example of a displayed multi-lenticular lightfield image.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
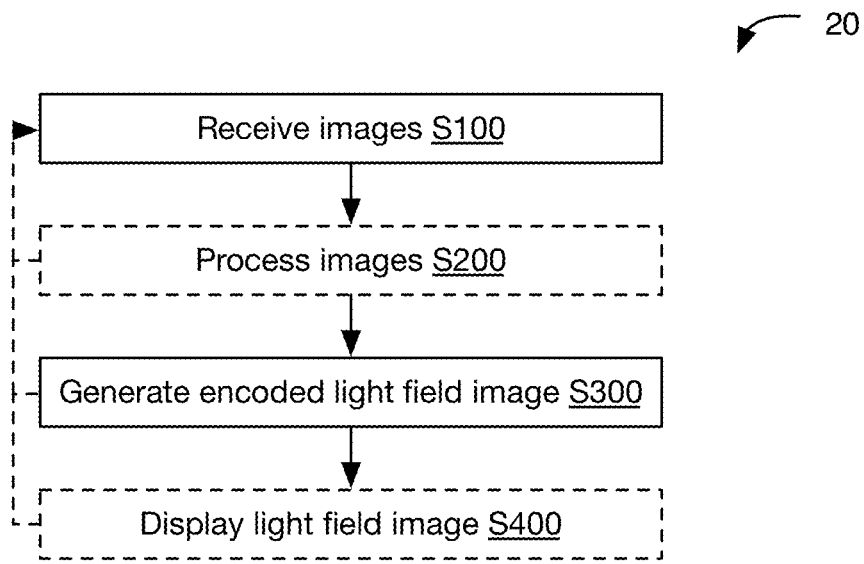
FIG. 2 is a schematic representation of a variant of the method.

As shown in FIG. 2, a method can include acquiring views and generating encoded light field image(s). The method can optionally include processing the views, displaying the light field image(s), and/or any suitable steps.

Figure 1:
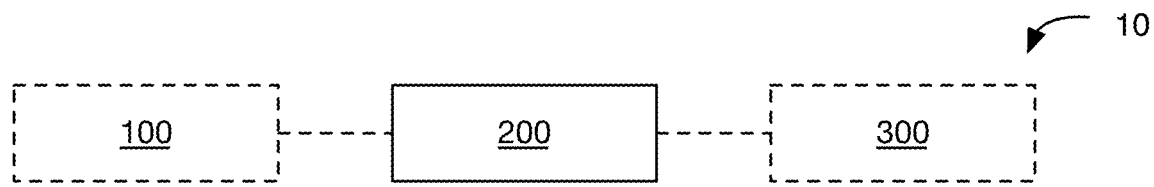
FIG. 1 is a schematic representation of the system.

As shown in FIG. 1, a system can include a computing system. The system can optionally include a camera array, a display, and/or any suitable components. The computing system can include a processing module, encoding module, decoding module, communication module, a storage module, and/or any suitable modules.

The system and method can function to acquire a plurality of views of a scene (e.g., from different perspectives), generate a light field image and/or light field video from the plurality of views, encode the light field image and/or light field video, and/or decode encoded light field images and/or light field videos. The system and method can enable compact light filed image transmission, while preserving high-resolution display quality.

2. Benefits.

Variations of the technology can confer several benefits and/or advantages. First, variants of the technology can decrease the size (e.g., amount of memory required to store the light field images and/or the bandwidth required to transmit the light field images, etc.) of the light field image (and/or light field video) by up to 90% (e.g., 10%, 20%, 30%, 40%, 50%, 75%, 80%, 90%, etc. compression ratio and/or data rate savings). The decreased size can facilitate and/or enable the light field images and/or light field video use, processing, transmission, display, storage, and/or any suitable manipulation in real-time or near-real time. In specific examples, encoding the light field images and/or light field videos (e.g., in a compressed format) can decrease the size of the light field images and/or light field video.

Second, variants of the technology can enable faster light field image (and/or light field video) generation and/or rendering (e.g., as compared to ray based encoding). In specific examples, raster-based encoding methods can require less processing power and can occupy less space than ray-based light field encoding methods.

Third, variants of the technology can enable higher quality lightfield images to be generated on weaker computing systems and/or computing systems that are not able to support a wide variety of image formats. This effect can be seen, for example, by comparing FIGS. 13A, 13B, and 13C. FIG. 13A shows an example of a lightfield image where the image format is uncompressed or compressed with low losses. FIG. 13B shows an example of the same lightfield image as FIG. 13A, but where the image format is compressed using a lossy compression (e.g., yuv420 pixel format). FIG. 13C shows an example of the same lightfield image as FIG. 13B using the same compression, but where the light field image has been multilenticularized. Comparing FIGS. 13B and 13C, the edges of objects in FIG. 13C are sharper and the colors are closer to the true color (as represented in FIG. 13A) than in FIG. 13B.

However, variants of the technology can confer any other suitable benefits and/or advantages.

3. System.

The system can function to acquire a plurality of views of a scene (e.g., from different perspectives), generate a light field image from the plurality of views, encode the light field image(s), and decode the encoded light field image(s). The light field image 400 can be a still image (e.g., an array of still images), a frame of a video (e.g., a lightfield video, a timeseries of arrays of images, an array of videos), a computer generated image, and/or any suitable image.

A light field image can include a set of views. The light field image(s) can include any suitable number of views between 1-250, such as 2, 4, 8, 10, 20, 40, 45, 50, 60, 70, 80, 90, 100, 110, 120, 130, 135, 150, 200, 250, and/or value therebetween. However, the light field image(s) can include greater than 250 images and/or any suitable number of views.

Each view is preferably collected from a different camera position (e.g., shows the scene from different perspectives, shows the scene from overlapping perspectives, etc.), but two or more views can be collected from the same location. The light field image(s) can be used to display a 3D representation of the scene (e.g., a holographic image), display a 2D representation of the scene, and/or be used for any purpose. The views are preferably contemporaneously or concurrently sampled (e.g., within a threshold time of each other), but can be sampled at any other suitable time.

Each view is preferably an image including an array of pixels, but can alternatively be a video or other data structure. The image is preferably associated with one or more color channels (e.g., a red, green, and blue channel), but can additionally or alternatively be associated with a depth channel and/or other channel. Each pixel of the image is preferably associated with a value for each channel of the image, but can additionally or alternatively have no value for each channel. The value is preferably generated by the camera sampling the view, but can additionally or alternatively be determined by an auxiliary sensor pixel-aligned with the camera, by calculating the value (e.g., inferring the depth per pixel using photogrammatic techniques, stereovision techniques, etc.), and/or otherwise determined.

Each view of the plurality of views can be indexed, named, tagged, associated with a source camera identifier (e.g., identifier for the camera sampling the respective view), and/or otherwise uniquely identified (e.g. within the light field image, globally, etc.). However, the views do not have to be uniquely identified. The views are preferably indexed consecutively from 1 to N (wherein N is the total number of views), but can be indexed from 0 to N−1, and/or indexed in any suitable manner. Each view can be indexed according to a corresponding camera position (e.g., of a camera position corresponding to the view within the camera array), corresponding camera number, corresponding camera (e.g., of the camera corresponding to the view), based on an orientation of the views (e.g., left-most view corresponds to number 1 while the right-most view corresponds to number N, right-most view corresponds to number 1 while the left-most view corresponds to number N, top-most view is number 1 while the bottom most view corresponds to number N, bottom-most view corresponds to number 1 while the top-most view corresponds to number N, etc.), randomly, pseudo-randomly, and/or any suitable index. The view indexing is preferably the same for all light field images, but the view numbering can vary between light field images. The views can be real views (e.g., images acquired by an optical sensor of a camera) and/or virtual views (e.g., generated by a virtual camera, renders, models, simulations, etc.).

The light field images can be quilt images, photosets, and/or have any suitable format.

A quilt image 450, as shown for example in FIG. 12, is preferably an a×b array of views, where a and b can be any number between 1 and N (e.g., the total number of views). The product of a and b is preferably N, but can be greater than or less than N (e.g., when one or more views is discarded). Within the quilt image, the set of views can be arranged (or indexed) in a raster (e.g., starting at the top left and rastering horizontally through views to the bottom right, starting at the top left and rastering vertically through views to the bottom right, starting at the bottom left of the quilt image and rastering horizontally through views to the top right, starting at the bottom left of the quilt image and rastering vertically through views to the top right, etc.), in a boustrophedon, randomly, and/or in any suitable order. The view arrangement within the quilt image preferably mirrors the arrangement (e.g., position) of the source camera within the camera array that sampled the respective views, but can be otherwise determined. The starting view can be associated with the first camera (e.g., wherein each camera is assigned a camera number), the left most camera of the camera array, the right most camera of the camera array, the center camera of the camera array, the top most camera of the camera array, the bottom most camera of the camera array, a random camera, and/or any suitable camera of the camera array. However, the quilt image can be arranged in any suitable manner.

A light field video can include a series of light field images (e.g., frames 400), each associated with a different time point, or include any other suitable format.

The encoded light field images and encoded light field videos are preferably compressed relative to the light field images and light field videos respectively (e.g., require less memory to store, require less bandwidth to transmit, etc.), but can be related to the light field images in any suitable manner. The encoded light field images can be: video (e.g., wherein each frame of the video corresponds to a view), depth arrays (e.g., depth quilts), 3D reconstructions, difference views (e.g., representing a difference between a first and second view within the light field image), polynomials (e.g., Lagrange polynomials), wavelets, and/or any suitable formats. The encoded light field video is preferably a video (e.g., wherein each frame is stored as metadata within a representative view of the frame; wherein every set of N frames corresponds to a light field image; etc.), but can additionally or alternatively include: a series of 3D reconstructions (and/or pose parameters thereof); a series of a depth arrays each representative of a frame; a series of difference light field images (e.g., difference between a first and second frame of the light field video; set of difference views between the same indexed view across successive frames); and/or any suitable format. The encoded light field video can be formed using zigzag compression (e.g., ping pong compression), difference compression, and/or any suitable compression.

The light field image(s) can optionally be associated with metadata. The metadata can be associated with (e.g., one or more of the following can store or otherwise be tagged with the metadata) a data structure such as: a view (e.g., a key view, a thumbnail, an image, a subportion of the light field image, etc.), a key light field frame, the encoded light field image, the encoded light field video, and/or any other suitable data structure. Examples of metadata can include: type of light field image (e.g., original light field image representation such as 'quilt image,' 'photoset,' 'depth quilt,' etc.; encoded light field image representation such as 'video,' 'raster,' 'ray,' 'zigzag,' 'depth array' or 'depth quilt,' 'scene graph,' '3D reconstruction,' 'polynomial,' 'wavelet,' format as described below, etc.), camera data (e.g., camera calibrations such as intrinsic parameters and/or extrinsic parameters for one or more cameras of the camera array; camera poses; camera distance from features of the scene; etc.), view data (e.g., tiling, crop region, crop orientation, view processing, view arrangement, view order, total number of views, etc.), codec data (e.g., compression algorithm used), technical metadata (e.g., camera pose, camera operation parameters, etc.), descriptive metadata (e.g., titles, captions, information provided by the user, etc.), administrative metadata (e.g., licensing information, owner information, etc.), structural metadata (e.g., view index, frame order, etc.) and/or any suitable metadata. The metadata can be appended to the data structure, embedded within the data structure, or otherwise associated with the data structure.

The optional camera array 100 functions to acquire views associated with a light field image. The camera array preferably includes a plurality of cameras, but can include a single camera. Each camera can be fixed (e.g., be mounted to have a static relation orientation, static absolute orientation, etc.) or moveable. The number of cameras in the camera array is preferably the same as the number of views in the light field image 400 and/or light field frame 400. However, the number of cameras in the camera array can be less than the number of views (e.g., when one or more cameras are mounted on a gantry, track, robot, motor, and/or other movement system and acquire images from more than one perspective) or greater than the number of views (e.g., to provide redundancy; to provide options for different perspectives such as above, below, wide view, narrow view, etc.; etc.). Each camera is preferably synchronized (e.g., acquires an image and/or frame within 100 ms of the other cameras), but the cameras can be unsynchronized. The image size (e.g., view size) is preferably the same for each camera (e.g., same size optical sensor for each camera, same pixel pitch, same pixel arrangement, etc.), but can be different (e.g., different optical sensor for each camera, different pixel pitch, different pixel arrangement, etc.). The camera array is preferably calibrated (e.g., camera pose for each camera known, intrinsic parameters for each camera known, extrinsic parameters for each camera known, etc.), but can be uncalibrated. The system can optionally include: one or more depth sensors aligned with each camera and/or the camera array (e.g., time of flight sensors, LIDAR, projected light sensors, etc.) and/or other sensors.

The optional display(s) 300 functions to display light field images and/or light field videos. The display can optionally display any suitable image and/or view. The display is preferably configured to display light field images that are formatted as a quilt image (e.g., as shown in FIG. 12). However, the display can display light field images that are formatted as a photoset, and/or in any suitable format.

The display is preferably configured or arranged to display the light field image as a holographic image (e.g., an image that appears three dimensional, such as the display can include cues or other visual information that leads to a perception of a three dimensional image), but can be configured to display the lightfield image as a 2D image, and/or otherwise be configured. Viewer(s) preferably perceive the light field image as three dimensional without using a peripheral (e.g., special glasses, headset, etc.). However, the display can use a peripheral (e.g., to enable the perception of the light field image as three dimensional, to enhance the perception of depth, to augment the light field image, etc.). The display is preferably configured to display the light field image to a plurality of viewers (e.g., where each viewer can see a different perspective of the three dimensional image, where each viewer can see the same perspective of the three dimensional image, etc.), but can display the light field image to a single viewer.

The display 300 can include one or more: light sources 320, optical elements 340 (e.g., lenses; polarizers; waveplates; filters such as neutral density filters, color filters, etc.; beam steerers; liquid crystals; mirrors; etc.), parallax generators 360 (e.g., lenticular arrays, fly lens, etc.), optical volumes 380, volumetric guides 385, and/or any suitable components. In specific examples, the display can be as shown in FIG. 3A, 3B, or 3C; any suitable display as disclosed in U.S. Pat. No. 10,191,295 entitled 'ADVANCED RETROREFLECTING AERIAL DISPLAYS', filed on 5 Jan. 2018 or U.S. Pat. No. 10,298,921 entitled 'SUPERSTEREOSCOPIC DISPLAY WITH ENHANCED OFF-ANGLE SEPARATION,' filed on 24 Jul. 2018, each of which is incorporated in its entirety by this reference; and/or any suitable display.

In variants including a plurality of displays, each display can be the same or different from the other displays.

The computing system 200 functions to process views, generate light field image(s) 400, generate light field video(s) 405, control the camera array and/or display, encode the light field image(s) and/or light field video(s), and/or decode the light field image(s) and/or light field video(s). The computing system can be local (e.g., to the camera array, to a camera of the camera array, to each camera of the camera array, to one or more displays, etc.), remote (e.g., cloud computing, server, network, etc.), and/or distributed (e.g., between a local and a remote computing system). The computing system can be in communication with the camera array, a subset of cameras of the camera array, the display(s), and/or with any suitable components. In an illustrative example, a computing system can include or be a single board computer such as a Raspberry Pi™ or Data General Nova. However, any suitable computing system can be used. The computing system (and/or a graphics processing unit (GPU) thereof) can support RGB (e.g., RGB24, RGB32, RGB555, RGB565, RGB888, etc.), YUV (e.g., YUV411, YUV420, YUV422, YUV444, etc.), CMYK, YIQ, YCbCr, YPbPr, xvYCC, HSV, HSL, CIE, and/or any suitable color encoding format. The computing system is preferably able to process at least 4 k videos (e.g., resolutions up to 3840×2160, 4096×2160, 7680×4320, other aspect ratios with a comparable total pixel count, etc. at frame rates of 20 Hz, 30 Hz, 60 Hz, etc.) but can be able to process HD videos (e.g., resolutions up to 1080p, 720p, etc.), low resolution videos, still images, and/or any image or video size. The computing system can include a processing module, a storage module, an encoding module, a decoding module, a communication module, and/or any suitable modules.

The processing module functions to process views, light field images, and/or light field videos. The processing module can apply transformations (e.g., translation, scaling, homothety, similarity transformation, reflection, rotation, shear mapping, affine transformations, projective transformations, similarity transformations, Euclidean transformations, etc.), crop views, compress views, align views (e.g., align one or more feature between views), rectify views (e.g., modify views to be on the same epipolar line), correct views (e.g., modify brightness, modify contrast, modify color, remove one or more pixels, etc.), and/or process the views in any suitable manner. In some variants, the processing module can additionally or alternatively lenticularize (e.g., by applying a display calibration to the lightfield image where the lenticularized image is displayed by the display) and/or multilenticularize the light field image. In a first illustrative example, a lightfield image can be lenticularized (or multilenticularized) at a processing module that is local to a display. In a second illustrative example, a lightfield image can be lenticularized using a processing module that is integrated in a remote computing server (e.g., a cloud computing system that has access to a calibration for a display). However, light field image can otherwise be lenticularized. The processing module can include one or more: GPUs, CPUs, TPUs, microprocessors, and/or any other suitable processor.

The communication module functions to receive and transmit data (e.g., images, instructions, etc.) and/or metadata. The communication module can enable long-range and/or short range communication. In specific examples, the communication module can include cellular radios (e.g., broadband cellular network radios) such as radios operable to communicate using 3G, 4G, and/or 5G technology, Wi-Fi radios, Bluetooth (e.g., BLE) radios, Zigbee radios, Z-wave radios, Thread radios, wired communication modules (e.g., wired interfaces such as coaxial cables, USB interfaces, fiber optic, waveguides, etc.), and/or any other suitable communication subsystems. The communication module can be included in the camera array, the central computing system, and/or any suitable computing system.

The storage module (e.g., memory) functions to store views, lightfield images, encoded light field images, encoded light field videos, and/or data (e.g., calibration data, camera pose, etc.). The storage module can store: acquired view(s), processed view(s), light field image(s), video(s), light field video(s), camera position(s), and/or any suitable data. The storage module can include volatile or nonvolatile memory.

The encoding module functions to generate encoded light field images and/or encoded light field movies from the views. The encoded light field images (and/or light field videos) are preferably compressed but can be uncompressed. The encoding module can arrange the views (e.g., organize the views into a quilt image, organize the views by view number, organize the views by perspective, etc.), determine depth maps (e.g., for one or more views), generate 3D reconstruction of the scene, calculate differences between views (and/or light field frames), determine key views (and/or key light field frames), store metadata with the key views (and/or key light field frames), compress the views, and/or perform any suitable steps.

The encoding module can include a codec, which functions to encode the light field image and/or light field video. The codec can include: lossy algorithms (e.g., transform coding such as discrete cosine transform, wavelet transform, etc.; reducing the color space; chroma subsampling; fractal compression; MPEG-4; yuv420; etc.), visually lossless algorithms, and/or lossless algorithms (e.g., run-length encoding, area image compression, predictive coding, entropy coding, dictionary encoding such as LZ, LZW, etc.; DEFLATE; chain codes; H.264; H.265; motion jpeg 2000; etc.).

The decoding module functions to convert the encoded light field image and/or encoded light field videos to a decoded format. The decoded format is preferably a light field image (and/or light field video), but can be any suitable format. The decoded format can depend on the display(s). The decoding module can arrange the views (e.g., organize the views into a quilt image, organize the views by view number, organize the views by perspective, etc.), interpolate between views (e.g., between depth map representations of views), views from 3D reconstruction(s) (e.g., using virtual camera(s)), add two or more views (and/or light field frames), determine key views (and/or key light field frames), determine metadata associated with key views (and/or key frames), decompress the views, and/or perform any suitable steps.

The decoding module can be the same as and/or different from the encoding module. In a specific example, the decoding module can perform the same operations as the encoding module in reverse order. In a second specific example, the decoding module can perform the inverse operation of the encoding module (e.g., addition instead of subtraction, decrypting instead of encrypting, etc.) in the same or reverse order of operations that the encoding module performed the operations. However, the decoding module can work in any suitable manner. 4. Method.

The method can include receiving views S100 and generating an encoded light field image S300. The method can optionally include processing the views S200, displaying the light field image S400, and/or any suitable steps. The method functions to generate a light field image (and/or light field video). The method can be performed once or multiple times (e.g., in parallel such as to generate more than one light field image at the same time, in series such as to generate each light field image sequentially, etc.). The method is preferably performed with the system disclosed above, but can additionally or alternatively be performed with any other suitable system.

Receiving the views S100 functions to access (e.g., acquire, retrieve, etc.) visual data (e.g., views 410) of a scene. S100 can be performed by a camera array, a computing system (e.g., a memory module, a server, database, a rendering module, etc.), and/or any suitable component. S100 can include taking images (e.g., with each camera of the camera array), translating one or more cameras to acquire images from different perspectives, retrieving images from memory, retrieving images from a database, generating a model of a scene, acquiring (e.g., projecting) views of a generated model, and/or any suitable steps. Each image preferably corresponds to a view of the light field image. However, any suitable images can be used for the views in the light field image. In variants, such as when the images are acquired by a camera and/or camera array, S100 can include transmitting the views to a computing system (e.g., to a cloud computing system, to a computing system collocated with a display, to a display computing system, to a camera computing system, etc.).

Processing the views S200 functions to process one or more views. S200 is preferably performed after S100, but can be performed at the same time as and/or before (e.g., when processed views are stored in the storage module)

S100. S200 is preferably performed by a computing system (e.g., a processing module), but can be performed by any suitable component. The light field images can be processed at a computing system collocated with the camera array (e.g., using a camera or camera array computer, etc.), at a remote computing system (e.g., at a cloud computing system), at a computing system collocated with a display (e.g., a display computing system), and/or otherwise be distributed. Processing one or more views can include: cropping views (e.g., according to a crop box), aligning views (e.g., positioning a feature of the views to the same position within the crop box), rectifying views (e.g., ensure that epipolar lines for all cameras are parallel), transforming views (e.g., applying affine transformation, a projective transformation, Euclidean transformation, etc.), correcting views (e.g., balancing brightness, modifying brightness, balancing contrast, modifying contrast, modifying color, etc.), refocusing views, and/or any suitable processing step. Each view can be processed in the same and/or different manner. However, one or more views can be unprocessed.

S200 can optionally include generating the light field image, which functions to convert the views (e.g., acquired in S100, processed in S200, etc.) into a light field image. Generating the light field image preferably includes generating a quilt image from the views, but can include generating a photoset from the views (e.g., a set of the views), and/or any suitable steps. The quilt image can be a dense array (e.g., with a view for every element), a semi-dense array (e.g., with a view for most elements, and N/A or a placeholder for the remaining elements), and/or a sparse array (e.g., with a view for less than a majority of elements).

Generating the encoded light field image(s) S300 can function to combine the views (e.g., processed views, unprocessed views, etc.) into an encoded light field image 420 (and/or encoded light field video 425). The views 410 are preferably those from a light field image 400, but can additionally or alternatively be views from a light field video (e.g., including multiple frames, wherein each frame can be a light field image), a lenticularized image (e.g., as described in S400), and/or other views or images. The light field images can be encoded at the camera array (e.g., using a computing system collocated with the camera array, using a camera or camera array computer, etc.), at a remote computing system (e.g., at a cloud computing system), at a computing system collocated with a display (e.g., a display computing system), and/or otherwise be distributed.

S300 is preferably performed after S200, but can be performed at the same time as and/or before S200. S300 is preferably performed after S100, but can be performed at the same time and/or before (e.g., when a light field image is stored in the storage module) S100. In variants, generating the light field image can be performed for: each light field image (e.g., still light field image, each frame of the light field video), for a light field video (e.g., the set of light field images that collectively define the light field video, a subset of the light field images of the light field video, etc.), and/or for any suitable images. The encoded light field image(s) can be generated from a light field video, a light field image, from the views, from a lenticularized image (e.g., as described in S400), and/or from any suitable images. S300 is preferably performed by a computing system (e.g., an encoding module), but can be performed by any suitable component.

The encoded light field image can include all N views, and/or a subset of views (e.g., less than N views). The number of views in the subset can depend on the encoding and/or decoding method, a target quality (e.g., amount of lose, image appearance, etc.) for the displayed light field image, depend on a transmission bandwidth, depend on a target image size, and/or otherwise be determined. For example, the encoded light field image can include 1, 2, 3, 4, 6, 8, 10, 15, 20, 25, 30, 40, values therebetween, >40, a multiple of the number of views (such as N/2, N/4, N/8, N/10, N/20, etc.), and/or any suitable number of views.

S300 can include determining key view(s), which functions to identify views within the subset of the views that include metadata and/or to determine a subset of views to append metadata to. The key view(s) can function as references within the encoded light field image(s) and can help prevent errors from accumulating (e.g., during decoding the encoded light field image). The key view(s) can be selected automatically and/or manually. One or more key views can be selected for a light field image. The number of selected key views (and/or which key views are selected) can be determined based on the encoding scheme, based on a view quality, and/or otherwise determined. The key view is preferably the first view (e.g., of the arranged views, view "1," view "N," etc.), but can be a view associated with a central perspective (e.g., approximately view N/2), a view associated with an occluded surface (e.g., view depicting a cavity that is occluded in other views), diametrically opposing views, and/or any suitable view. However, the key view can be an image of the scene, an icon, a thumbnail, a drawing, a render, and/or any suitable visual. In variants, a key view can be included with any suitable frequency between every view and every 100*N views (such as every N/10, N/5, N/4, N/2, N, 2*N, 4*N, 10*N, 20*N, 30*N, 50*N, etc. views) such as between a predetermined number of lightfield images and/or with any suitable frequency. However, key views can be included once (e.g., the first view), randomly, based on a ruleset (e.g., a key view corresponding to each light field image, a key view based on a difference in visual data in views, a key view based on changes in view order, etc.), and/or at any suitable frequency. In a specific example, the key view can be a thumbnail generated by shrinking a view from the light field image to a smaller representation of the view (e.g., if the original view has a resolution of 1080p, the thumbnail may have a resolution of 30p, 60p, 96p, 120p, 144p, 240p, etc.). However, any suitable key frame can be used.

The metadata can function to provide instructions regarding how the light field image and/or light field video is encoded (e.g., to enable or facilitate decoding the encoded data), provide information regarding the camera array (e.g., camera calibration), and/or can perform any suitable function. In specific examples, the metadata can include: view number, key frame (e.g., indicating a key frame, such as a specific light field image, within a light field video), view order (e.g., how are the views arranged such as ascending order, descending order, etc.), a compressed video (e.g., a video that includes each view associated with a light field image), scan (e.g., type of scan), metadata as described above, and/or any suitable information.

S300 can include compressing data (e.g., views, light field images, videos, lightfield videos, depth maps, depth arrays, difference light field images, metadata, etc.), which functions to decrease the size of the data and/or generate the encoded light field image. The data is preferably compressed in a video format (e.g., using a video codec), but can be compressed in an image format and/or in any suitable format. The data is preferably compressed using a codec, but can be compressed or encoded using machine learning (e.g., a neural network such as a convolutional neural network, deep neural network, nonlocal neural network, recursive neural network, etc.; a genetic algorithm; Bayesian optimization; geometry networks; context networks; Adaptive Separable Convolution; Deep Voxel Flow; etc.) and/or using any suitable algorithm and/or computer code. The codec can include: lossy algorithms (e.g., transform coding such as discrete cosine transform, wavelet transform, etc.; reducing the color space; chroma subsampling; fractal compression; MPEG-4; etc.), visually lossless algorithms, and/or lossless algorithms (e.g., run-length encoding, area image compression, predictive coding, entropy coding, dictionary encoding such as LZ, LZW, etc.; DEFLATE; chain codes; H.264; H.265; motion jpeg 2000; etc.). However, the data can be compressed in any suitable manner. During encoding (and decoding), the data can be scanned in any manner. For example raster scanning, continued raster scanning, diagonal scanning, diagonal scanning with parallel returns, right orthogonal scanning, spiral in scanning, spiral out scanning, continued orthogonal scanning, vertical symmetric by rows scanning, vertical symmetric by columns scanning, main diagonal symmetric scanning, diagonal symmetric by secondary lines scanning, z-scanning, block scanning, x-scanning, and/or any suitable scanning can be used.

In a first embodiment, S300 can include arranging the views, which functions to create a linear array of views (e.g., an M×1 array, where M is a natural number; a timeseries of sequential views; etc.). However, the views can be arranged in a two dimensional array and/or in any manner. The views can be arranged in ascending order (e.g., according to the respective view index, pose, etc.), descending order, randomly, according to a predetermined pattern, and/or in any suitable manner. The arranged views can start at the first view, the last view, a central view (e.g., view number approximately N/2), a random view, and/or any suitable view. The views are preferably arranged in the same order for each light field image and/or light field video (or the views associated therewith), but the views can be arranged in a different order for each light field image and/or light field video.

In a first example, for a (still) light view image with N views, the linear array can be an N×1 array of the views arranged in ascending order starting at 1.

Figure 9:
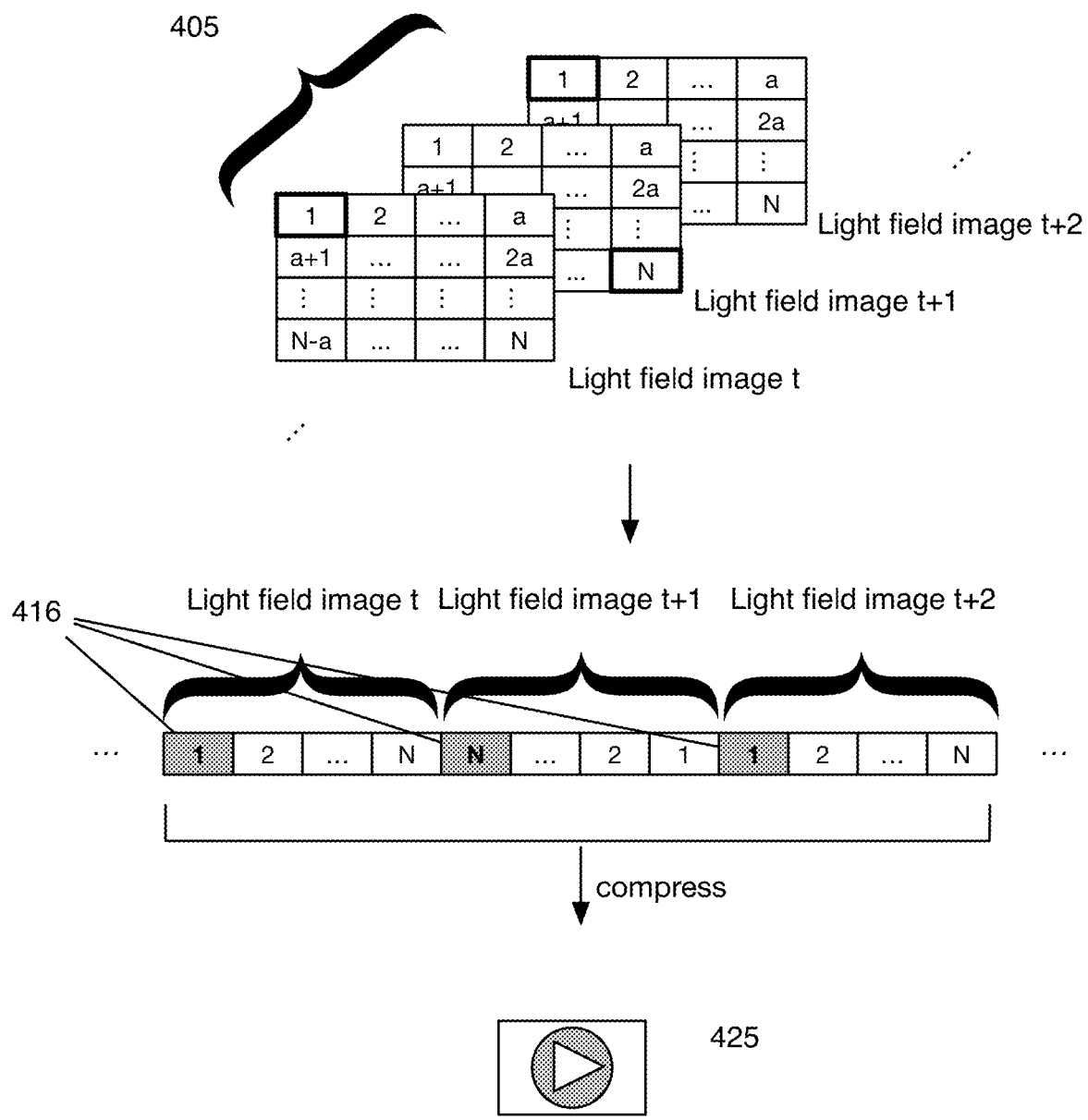
FIG. 9 is a schematic representation of an example of generating a light field video, where the light field video is encoded in a 'zig zag' video format.

In a second example, for a light field video with k sequential light field images, wherein each light field image includes N views, the linear array can be an (N*k i.e., N multiplied by k)×1 array. In the second example, the views from consecutive light field images of the light field video can have alternating arrangements (e.g., 1 . . . N, N . . . 1, etc.; ordered in a sequentially inverting raster order also referred to as a "zigzag" or "ping-pong" order), or be arranged in the same order (e.g., 1 . . . N, 1 . . . N, etc.). In a specific example, as shown in FIG. 9, views associated with a light field image of the light field video can be arranged in ascending order starting with view 1. In this specific example, views associated with the subsequent light field image of the light field video can be arranged in descending order starting with view N. This alternating arrangement of views between light field images can be referred to as a "zigzag arrangement" or "ping pong arrangement," where light field videos that are compressed with these arrangements can be referred to as "zigzag compressed" or "ping pong compressed". However, the views associated with a light field video can be arranged in any suitable order.

In a second embodiment, S300 can include determining a depth map, which functions to determine a depth to each pixel (and/or feature) within a given view. The depth map preferably encodes the depth to each pixel in an image, but can encode the depth to a subset of pixels of the image (e.g., the subset of pixels corresponding to one or more features) and/or any suitable information. The depth map is preferably determined for a subset of the views of the light field image, but can be for all views, and/or any suitable views. The views within the subset of views are preferably evenly spaced (e.g., alternating views, every $3^{rd}$, $4^{th}$, $6^{th}$, $8^{th}$, $12^{th}$, $20^{th}$, etc. view), but can be irregularly spaced, selected according to a ruleset (e.g., one view from each row of a quilt image, one view from each column of a quilt image, selected based on the inter-view change, etc.), or selected in any suitable manner. The depth map is preferably determined between adjacent views (e.g., a depth map associated with the first view can be determined between the first and second view; a depth map associated with the second view can be determined between the first and second or second and third view, etc.), wherein the adjacent views can be spatially adjacent or temporally adjacent, but can be determined between any pair of views. The depth map is preferably determined based on the set of disparity vectors between the views, but can additionally or alternatively be determined using a depth sensor (e.g., be measured or acquired when the view is acquired) and/or otherwise be determined. The disparity vector can be a vector that indicates a pixel separation between a pixel in one view and a corresponding pixel in another view. The depth map can be calculated using the disparity vector and the camera calibration (e.g., the camera intrinsic parameters such as focal length, principle point, etc.; camera extrinsic parameters such as separation between cameras, camera pose, etc.; etc.). However, the depth map can be determined with a depth sensor (e.g., paired with the camera, with the camera array, etc.), or in any suitable manner.

In an illustrative example, the depth map for view 1 is determined by determining the disparity vector between view 1 and view 2 (e.g., by identifying corresponding pixels and/or features between view 1 and view 2), and calculating the depth map using the camera calibration and the disparity vector.

In a second illustrative example, the depth map for view 10 can be determined by interpolating the depth map determined between view 9 and view 10 and the depth map determined between view 10 and view 11.

In a third illustrative example, the depth map for a view can be determined using a machine learning algorithm (e.g., a neural network). However, the depth map can be interpolated in any suitable manner.

Determining the depth map can include determining a depth array 421 (also referred to as a "depth quilt image"). The depth array 421 can include one or more of: the set of views, the depth map associated with each of the set (and/or subset) of views, the subset of views (and the associated depth maps), the color data (e.g., RGB values for each pixel or view) for the subset of views, the relationship between the subset of views (e.g., correspondences between pixels of views within the subset of views), and/or any suitable information. The depth array can be arranged in a linear array (e.g., vertical array, horizontal array, etc.), a 2D array (e.g., such as an M×2 array wherein M corresponds to the number of views in the subset of views and the depth array includes the subset of views and the depth map corresponding to the subset of views), and/or any manner. In an illustrative example, a depth array can be a quilt image where each view in the quilt image includes depth information as well (e.g., in the alpha channel of the image data). However, a depth array can otherwise be defined.

In a variant of the second embodiment, S300 can include generating a 3D reconstruction, which functions to generate a geometric reconstruction of the scene. The 3D reconstruction 423 can be represented using voxels, rays, polygons, contours, points, depths, meshes, convex hulls, and/or be represented in any way. The 3D reconstruction can option include a texture (e.g., color texture). The 3D reconstruction is preferably generated from the depth maps (e.g., the depth maps corresponding to the subset of views, depth maps corresponding to the set of views, depth maps corresponding to another set of views, etc.) and the camera array calibration (e.g., the intrinsic and/or extrinsic parameters associated with the camera array), but can alternatively be determined from a geometric scan of the scene or otherwise determined. The 3D representation can be complete (e.g., include data for all sides of the representation), or incomplete (e.g., include data for a portion of the representation, include only data from a given point of view, etc.). In a specific example, generating the 3D reconstruction can include: determining the depth map (e.g., for a subset of views), generating a geometric 3D reconstruction from the depth maps (e.g., based on the physical relationships between the views within the view subset), and projecting the views from the view subset onto the geometric 3D reconstruction to generate a visual 3D reconstruction of the scene. In this specific example, the geometric 3D reconstruction can be a convex hull, a mesh, and/or any suitable structure. However, the 3D reconstruction can be generated in any suitable manner.

A 3D reconstruction is preferably determined for a light field image, but can additionally or alternatively be determined for a light field video and/or any other data structure. In a first example, a light field video can be represented by a single 3D reconstruction with different poses (e.g., representative of the scene pose relative to a point of view). In a second example, a light field video can be represented by a series of 3D reconstructions, each representative of a respective light field image (frame) of the light field video. However, light field videos can be otherwise represented.

In a third embodiment, S300 can include determining difference light field images, which can function to determine differences between views in one light field image and views in another light field image (and/or between views within a given light field image). Each difference light field image 427 can include a set of difference views, wherein a difference view can be the difference between two views (e.g., views with the same index in two different frames; two different views in the same light field image, etc.) In variants of this embodiment, the majority of light field images (e.g., greater than about 50%, 60%, 75%, 90%, 95%, 97.5%, 99%, 100%, etc. of light field images) of a light field video can be encoded as difference light field images. For example, twenty nine out of every thirty frames of a lightfield video can be represented as difference light field images. However, a minority of the light field images (e.g., less than about 1%, 5%, 10%, 25%, 30%, 40%, 50%) of a light field video can be encoded as difference light field images. The difference light field images can be computed from arranged views, light field images, as acquired views, as processed views, and/or any suitable views and/or images can be used. A difference light field image is preferably computed for consecutive light field images (e.g., consecutive frames of a light field video, frame prior to the current frame, frame after the current frame, etc.), but can be computed between a light field image and a key light field image (e.g., a reference light field image), a light field image and a nonconsecutive image, and/or between any suitable light field images. In an illustrative example, the difference light field image associated with light field image t (where t is an index) is the difference between light field image t and light field image t−1. The difference is preferably computed between analogous views of the light field images (e.g., same view index, views associated with the same camera, views associated with the same camera position, etc.), but can be computed for nonanalogous views. In some variants of the third embodiment, difference light field images can include difference views computed between views of the same light field image, such as views associated with adjacent cameras, with adjacent camera positions, and/or between any suitable views.

In a first variant, determining the difference light field images can include determining difference views (e.g., between as acquired views, between arranged views, etc.) and generating a difference light field image from the differenced views. The difference views are preferably determined between views from different light field images that were captured by the same camera, but can alternatively be determined between views of the same light field image. In a second variant, determining the difference light field image can include determining difference views and arranging the views (e.g., as described above). In a third variant, determining difference light field images can include calculating a difference between two light field images and arranging the views from the difference light field image. However, determining difference light field images can include any suitable steps.

In a fourth embodiment (as shown for example in FIG. 17), S300 can include determining a representation associated with the light field image. The representation is preferably a polynomial representation, but can include any suitable decomposition (e.g., a wavelet transformation, a frequency decomposition, into any suitable orthogonal or nonorthogonal functions, etc.). The coefficients of the polynomial preferably encode (e.g., stores, represents, etc.) the image (e.g., color information, color for a given color channel, depth, etc.); however, additionally or alternatively the polynomial order and/or any suitable characteristic can encode the image information. For example, the polynomial can include a different variable for each channel for each pixel of the constituent views, wherein the coefficient can represent the value of the given channel. In another example, each variable can represent a different view. However, the polynomial can be otherwise constructed. The polynomial representation can be determined, for example, using Lagrange decomposition, using spline interpolation, using polynomial fitting, and/or otherwise be determined. The polynomial representation can be determined image-wise (e.g., to a light field image as a whole), view-wise (e.g., a view of a light field image is associated with a polynomial), cluster-wise (e.g., a cluster of pixels within a view is associated with a polynomial), pixelwise (e.g., individual pixels are associated with a polynomial), and/or otherwise be applied.

In variants of S300, two or more of the first, second, third, and/or fourth embodiments can be combined and/or applied to the same lightfield image.

The method can optionally include transmitting the light field image(s) (e.g., encoded lightfield image(s), lenticularized image, decoded light field image, etc.), which functions to transmit the light field image(s) to an endpoint. The endpoint can include one or more: display, memory module (e.g., of a computing system), processing module, decoding module, computing system, database, server, user, viewer, and/or any suitable component. Transmitting the light field image(s) can be performed by a communication module (e.g., of the computing system) and/or by any suitable component. Transmitting the light field image(s) can include storing the light field image(s), which can function to provide the light field image(s) for retrieval at a later time. The light field images can be stored at a storage module of a computing system and/or by any suitable component. However, the light field image, views, and/or any suitable data can be transmitted.

The lightfield images can be stored as encoded lightfield images, as lenticularized lightfield images, mulitlenticularized images, as raw lightfield images, and/or in any format.

Displaying the light field image S400 functions to display the light field image to one or more viewers. S400 preferably displays the light field image decoded from the encoded light field image, but can display the encoded light field image, a light field image (e.g., generated in S300), views or a light field image as received in S100, a lenticularized image, and/or any suitable views and/or image. The display light field image is preferably perceived as three-dimensional (e.g., a holographic image), but can be perceived as two-dimensional, one dimensional, and/or otherwise be perceived. The light field image is preferably viewable without using peripherals (e.g., headsets, glasses, etc.). For example, the displayed light field can be perceived as three dimensional without the use of peripherals. However, the light field image can be viewable using peripherals. S400 preferably occurs after S300, but can occur before and/or at the same time as S300. S400 is preferably performed by a display, but can be performed by a computing system and/or any suitable system. The light field image is preferably displayed as a 3D render of the scene, but can be a 2D render of the scene and/or any suitable render of the scene.

S400 can include decoding the encoded light field image(s) (and/or video), which functions to convert the encoded light field image into a light field image that can be read by one or more displays. The encoded light field image(s) are preferably decoded based on information in the metadata of one or more key view(s) of the encoded light field image(s), but can be decoded independent of the metadata and/or based on any suitable information. The encoded light field image can be decoded in parts (e.g., decode one light field image at a time, decode a set of light field images at a time, decode a buffer of light field images, decode a buffer of views, etc.) and/or in full (e.g., decode all views at once, decode all light field images at once, etc.). The views and/or light field images can be decoded sequentially (e.g., one view at a time, one image at a time, etc.) and/or in parallel (e.g., decode multiple views simultaneously, decode multiple light field images simultaneously, etc.). The light field images can be decoded at the camera array (e.g., using a computing system collocated with the camera array, using a camera or camera array computer, etc.), at a remote computing system (e.g., at a cloud computing system), at a computing system collocated with a display (e.g., a display computing system), and/or otherwise be distributed.

In a first embodiment, decoding the encoded light field image(s) can include decompressing the encoded light field image(s), which can function to extract views from the encoded light field image(s). This is preferably used when the light field image is encoded as a video, but can be used for other encoding schemes. The views are preferably extracted in order (e.g., in view order, based on the view indexing, based on the key frame metadata, etc.), but can be extracted in any suitable order. In a specific example, the views (e.g., the set of views corresponding to a light field image) can be extracted from a video (e.g., a stored video, an encoded light field image, a video in the metadata of a thumbnail, etc.) and arranged in a light field image (e.g., a quilt image). The arrangement order can be: specified by the metadata, specified by the encoding scheme (e.g., the arrangement pattern), or otherwise determined.

In a second embodiment, decoding the encoded light field image(s) can include interpolating between views of the encoded light field image, which can function to recover and/or prepare views that are not stored in the encoded light field image. This is preferably used when the light field image is encoded as a depth array, but can be used for other encoding schemes. New views are preferably generated by interpolating between the stored views, but can be generated by reprojecting a 3D model (generated based on the stored views) into a set of virtual cameras, generating the views using a trained neural network, and/or generated in any suitable manner. Interpolating between the stored views can include interpolating between the pixel locations for the adjacent views, interpolating based on the depth map for the adjacent views, and/or any suitable steps. The adjacent views can be temporally adjacent, spatially adjacent, adjacent in the array and/or otherwise related. However, new views can be simulated (e.g., an optical model of the scene) and/or determined in any suitable manner.

In a first variant of the second embodiment, generating intermediate views can be performed using a neural network. For example, Depth-Aware Video Frame Interpolation (DAIN), Channel Attention Is All You Need for Video Frame Interpolation (CAIN), frame interpolation with multi-scale deep loss functions and generative adversarial network (FIGAN), and/or any suitable machine learning algorithm can be used to generate views intermediate between two (or more) views. In this variant, the intermediate views can be generated from the views, from depth information associated with the views, and/or using any suitable information.

In a second variant of the second embodiment, generating intermediate views can include projecting (or reprojecting) two (or more) views. The intermediate views can be projected from views associated with a camera position to the left of the intermediate view, views associated with a camera position to the right of the intermediate view, views associated with a camera position above the intermediate view, views associated with a camera position below the intermediate view, and/or any suitable views. Preferably, intermediate views are projected from at least two views (e.g., views on opposing sides of the view to reproject such as a view left of the intermediate view and a view right of the intermediate view), but can be projected from a single view, four views, eight views, and/or any suitable number of views.

In an illustrative example of the second variant, an intermediate view can be generated by determining a depth pixel-by pixel from a first view; initializing the intermediate view with the depth for each pixel from the first view (e.g., initially, the intermediate view has the same depth information as the first view); determining a pixel offset between the first view and the intermediate view based on: the depth, a difference in perspective (e.g., a difference in angle, a target difference, etc.) between the first view and the intermediate view, and/or camera properties (e.g., camera perspective, distance from a convergence plane, etc.); and writing the color value for a given pixel from the first view to the intermediate view at pixel determined using the pixel offset. When the depth of the intermediate view pixel (e.g., from the initial intermediate view) is less than the depth of the given pixel, the color value is not written to the intermediate view (e.g., because the pixel would be occluded in the intermediate view). When the depth of the intermediate view pixel is greater than the given pixel, the color and depth texture for the intermediate view is rewritten. In variants, the process in this illustrative example can be repeated using a second view to generate the intermediate view. The process can be selectively repeated (e.g., to fill gaps in the intermediate view) and/or repeated for the whole intermediate view. The resulting intermediate views (e.g., reprojected from the first view and the second view) can be combined by: averaging the views, merging the views (e.g., keeping pixel data for pixels that agree, keeping pixel data that is not out of bounds or not a number, etc.), a composite view, and/or otherwise combining the views or using a single generated view.

In variants of this specific example, when the depth of the intermediate view (e.g., the initialized intermediate view) is within a threshold (e.g., within a depth of <0.0001, 0.0001, 0.0005, 0.001, 0.005, 0.01, 0.05, 0.1, 0.5, 1, 5, 10, >10, values therebetween, etc.) of the depth from the reprojecting view; the color for the intermediate pixel can be determined by interpolating the color from the projected views. As shown for example in FIG. 6, a pixel in intermediate view i can be determined by interpolating between pixels for views j and j+a. However, the pixels can otherwise be interpolated.

In some variants of this specific example, a flickering phenomenon can be observed, for instance, when two or more instances of the process try to provide color data to the same pixel concurrently. The flickering phenomenon can be mitigated, for instance, by repeating (e.g. using a previous iterations intermediate view as the initial intermediate view for the current iteration) the reprojection process two or more times where each repeat can further decrease the flickering phenomenon. However, the flickering phenomenon (and/or other artifacts) can otherwise be mitigated.

In a third embodiment, decoding the encoded light field image(s) can include generating a set of views from a 3D representation, which can function to generate a set of virtual views 414 (e.g., virtual images) associated with a light field image of a scene. This is preferably used when the light field image is encoded as a 3D representation, but can be used for other encoding schemes. The set of virtual views is preferably generated using a set of virtual cameras 150 (e.g., a set of virtual cameras that are simulated with the same calibration parameters as the camera array, a set of virtual cameras with a different calibration parameters from the camera array, a set of virtual cameras positioned based on the viewer and/or user position, camera model, etc.), but can be generated in any manner. The set of virtual cameras can be positioned at a location within or relative to the 3D representation based on the display, based on a position of one or more viewers relative to the display, at predetermined positions, and/or otherwise be positioned. The set of virtual views preferably includes the same number of views as the light field image, but can include more virtual views and/or fewer virtual views than the number of views in the light field image. The virtual views are preferably arranged (e.g., in the same order as the views, in a different order from the views) to generate the light field image to be displayed.

In a first variant of the third embodiment, the color for the virtual views can be sampled from a texture of the 3D representation. In an illustrative example, the views can be generated using photogrammetry techniques. However, the views can otherwise be generated.

In a second variant of the third embodiment, the color for the virtual views can be determined based on a color extracted from the views used to generate the 3D representation. Typically, in the second variant, a texture (e.g., color texture) is not applied to the 3D representation. However, a texture can be applied to the 3D representation. The color information for the virtual views can be extrapolated, interpolated, inferred, and/or otherwise generated from the views used to generate the 3D representation. However, an image (e.g., from the set of views used to generate the 3D representation) can be associated with the 3D representation and color information can be sampled from the image (e.g., interpolating between or extrapolating from pixels as needed) and/or the color information can otherwise be generated.

In a fourth embodiment, decoding the encoded light field image(s) can include combining the views from the encoded light field image (e.g., calculating views from a key view 416 and a set of difference views 418), which functions to recover the original light field image(s) from the encoded light field image(s). This is preferably used when the light field image is encoded using difference views, but can be used for other encoding schemes. Combining the views preferably includes adding a light field image to a difference light field image, but can include any suitable steps. Combining the views is preferably performed sequentially (e.g., starting at a key light field image, each subsequent difference view added to a preceding view) to recover the set of light field images, but can be performed in parallel (e.g., starting at each key light field image, each difference view added to a key view) and/or in any suitable order.

In a fifth embodiment, decoding the encoded light field image(s) can include computing or extracting the light field images from a decomposition representation (e.g., a polynomial representation) of the images.

S400 preferably includes generating a lenticularized image from a lightfield image. A lenticularized lightfield image 430 (e.g., holographic image) preferably refers to lightfield images that have been aligned to a display, but can be otherwise defined. Aligning the lightfield images to a display preferably includes applying a calibration associated with the display to the lightfield image (e.g., to align pixels of the lightfield image to display pixels), but can be otherwise performed. Generally, though not exclusively, the calibration is unique to a display, therefore lenticularized images are typically associated with a small number of displays (those displays with substantially the same calibration). However, lenticularized lightfield images can be associated with any number of displays.

Figure 15A:
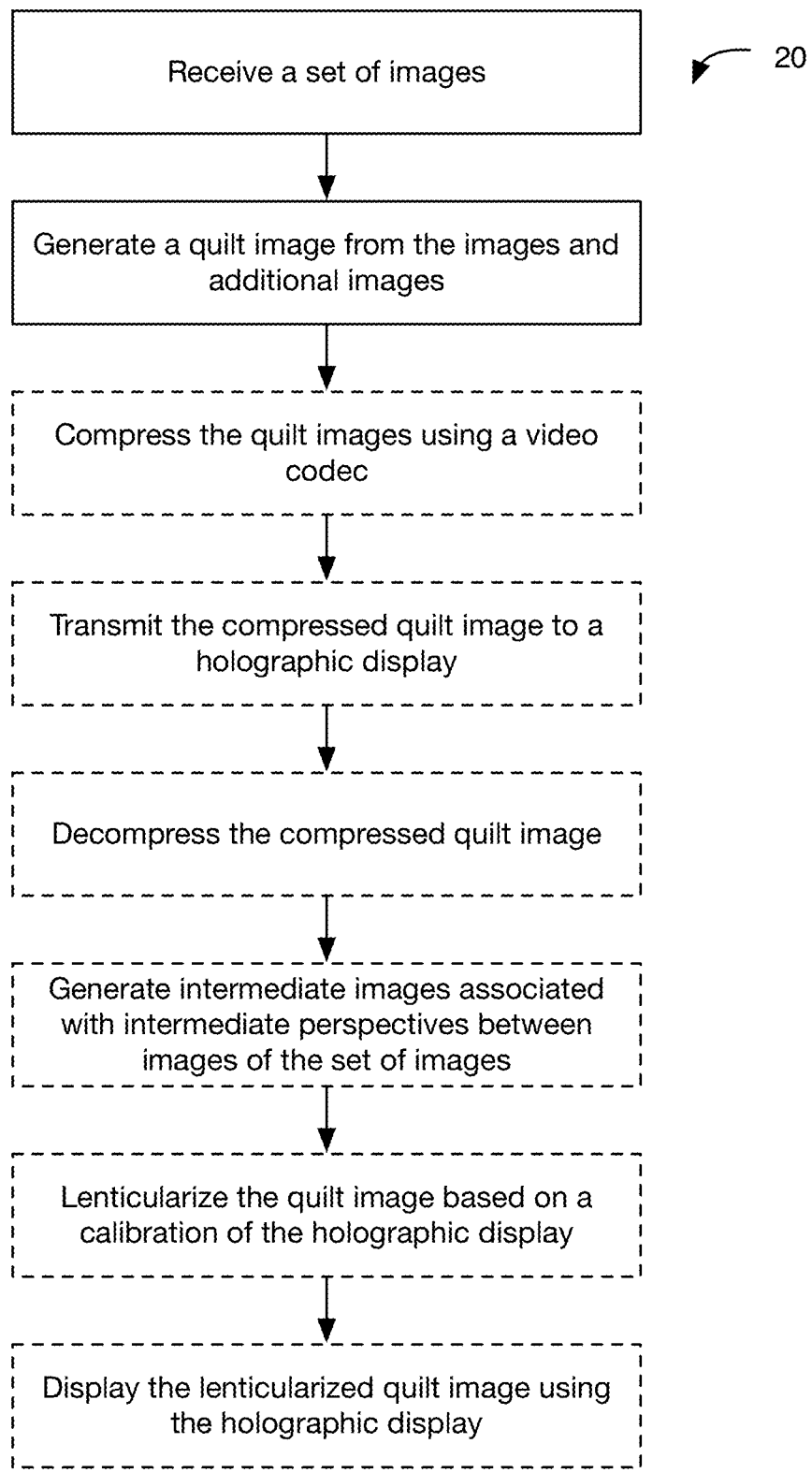
FIGS. 15A and 15B are schematic representations of examples of the method.
Figure 15B:
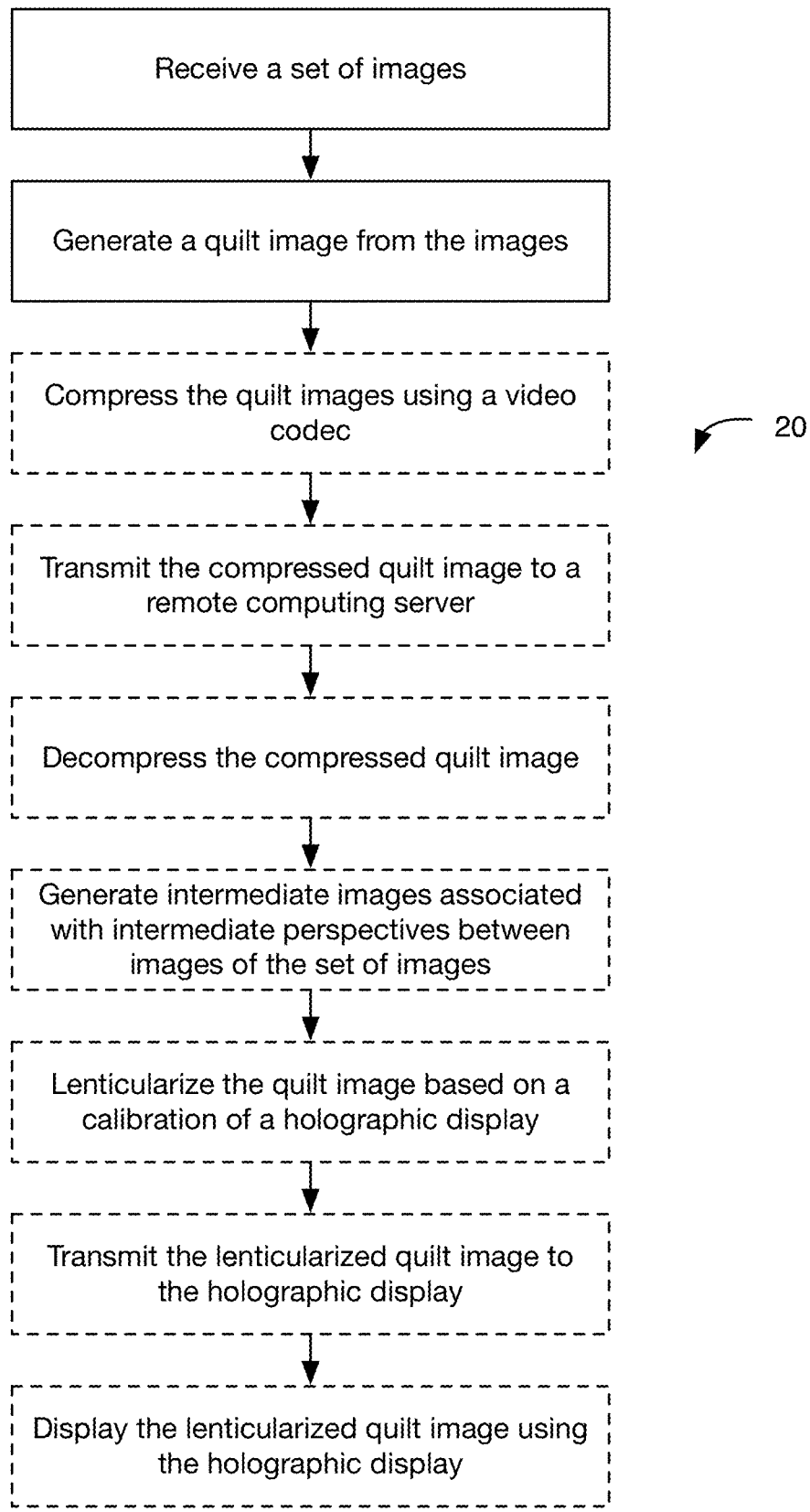

The lenticularized image can be generated at a computing system collocated with the display (e.g., a display computing system, as shown for example in FIG. 15A), at a remote computing system (e.g., cloud computing, as shown for example in FIG. 15B, where the cloud computing system can store the calibration(s) for one or more display and/or receive the calibration associated with each of one or more display), and/or at any suitable computing system.

Figure 14A:
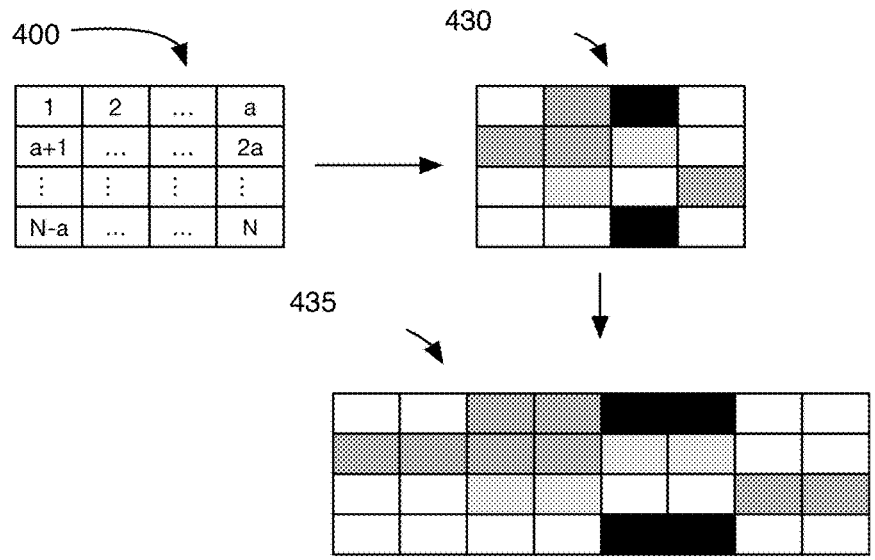
FIGS. 14A and 14B are schematic representations of examples of a double lenticular representation of a lightfield image.

A multi-lenticularized preferably refers to a lenticularized lightfield image that has been duplicated along at least one axis, but can be otherwise defined. Multilenticularization can function to decrease a chromatic anomaly present in the displayed image and/or otherwise function. Multilenticularization is particularly, but not exclusively, beneficial when the computing system (e.g., a GPU thereof) is able to handle higher resolution images than need to be displayed, but is only able to work with images that use a lossy image format (such as a format that is not pixel perfect, that does not perfectly preserve color, etc.). The number of multiples for duplication can be associated with the degree of lenticularization. For example, as shown in FIG. 14A, a lenticularized image that has been duplicated once (e.g., such that each pixel is represented two times in the resulting lenticularized image) can be referred to as a double-lenticularized image 435 (e.g., double lenticular image). The multiple is preferably an integer, but can be a rational or irrational value. Analogously, the entire lenticularized lightfield image is preferably duplicated. However, any subset of the lenticularized lightfield image can be duplicated. In specific examples, particularly when the image compression retains approximately half of the pixel color information, double lenticularization (e.g., lenticularization with a multiple of 2) can be sufficient to mitigate the effects of artifacts arising from the image compression. However, any suitable multiple can be used.

The multilenticularized lightfield images is preferably generated using nearest neighbor filtering (also referred to as point filtering), but can be generated using any suitable algorithm. Multilenticularized lightfield images are preferably generated by duplicating the pixel column of the lightfield image a number of times equal to the multiple. For example, as shown in FIG. 14A, each pixel column of a double lenticularized image can be duplicated twice. However, multilenticularized lightfield images can additionally or alternatively be generated by duplicating each pixel row, by duplicating each column and each row, by duplicating the pixels along an offset, duplicating a subset of pixels of the image, duplicating the entire lenticularized image (e.g., wherein the duplicate can be appended to the left, right, top, bottom, and/or offset from one of the directions relative to the original lenticularized image), and/or be otherwise generated. Duplicate pixels are preferably adjacent or proximal the duplicated pixel (e.g., where the duplicated pixel can be along one edge or along the center of a contiguous pixel block of the duplicated pixel), but can be otherwise arranged.

Figure 14B:
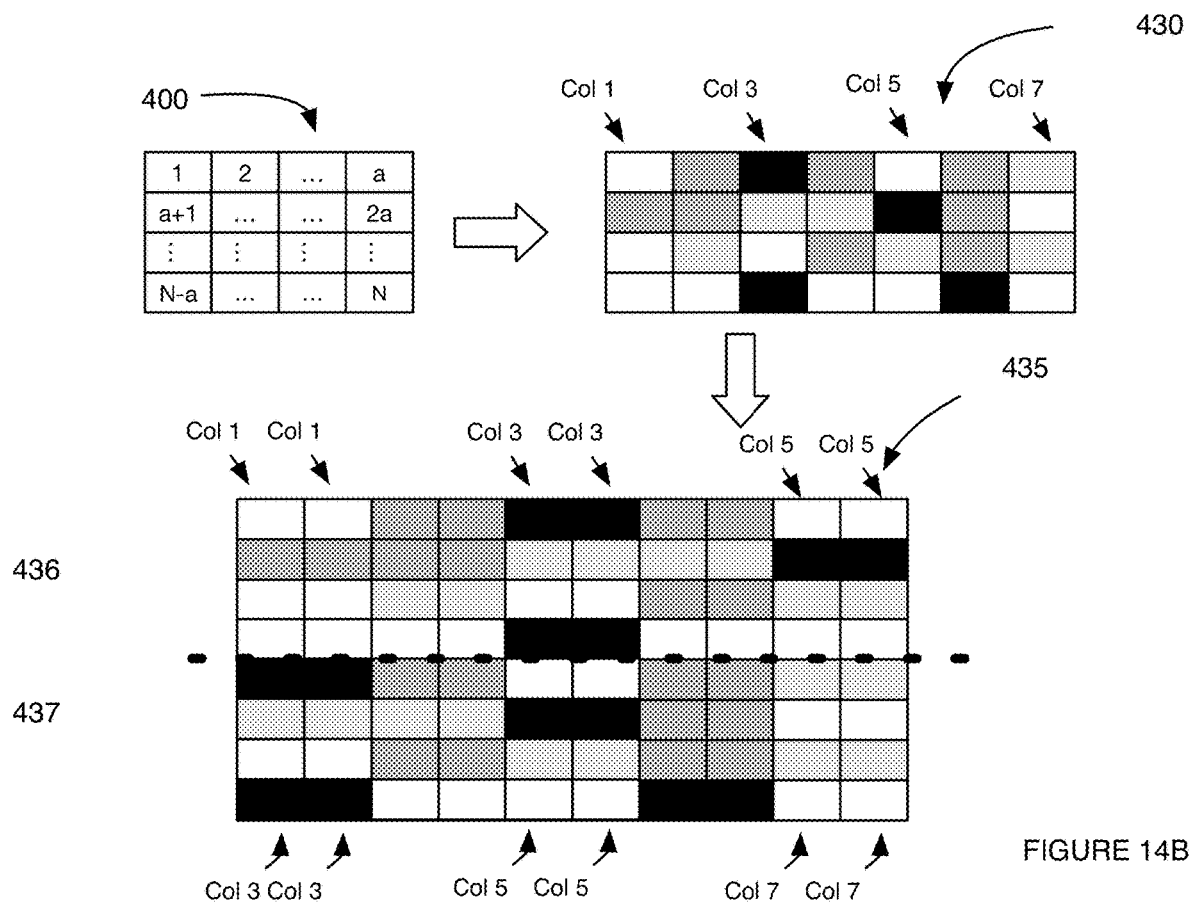

In some variants of lenticularized images, the image can be distributed across two or more rows (or columns), where each row (or column) includes a subset of the image. For instance, a first segment 436 of the lenticularized image can be appended to a second segment 437 of the lenticularized image, wherein the first segment and second segment can share a predetermined number of identical pixels. Each portion (or segment) preferably includes a predetermined number of overlapping pixels with other portions (or segments), which can function to improve and/or ensure that the portions (or segments) can be stitched together for display. The predetermined number can depend on an image resolution, a computing system (e.g., a processing module, GPU, etc. thereof), be a fixed value, depend on an image quality, and/or can otherwise be selected. The predetermined number is preferably at least 16 pixels (e.g., 16 distinct pixel columns such as 20, 25, 30, 40, 50, 60, 75, 100, 150, etc.), but can be less than 16 pixels. In these variants, the rows can be multi-lenticularized. In a specific example, as shown in FIG. 14B, a lenticularized image can be split between a top image portion and a bottom image portion, where each portion is approximately the same size (e.g., includes the same number of pixels). In this example, each pixel of the lenticularized image can be duplicated. Between the top image portion and bottom image portion, a group of stitching pixels (e.g., overlapping pixels) is duplicated on the right edge of the top image portion and the left edge of the bottom image portion. However, the lenticularized image can be divided into any number of portions and/or arranged in any manner.

S400 can optionally include modifying a resolution of the lightfield image. Modifying the resolution is particularly, but not exclusively, beneficial for multilenticularized images where the image resolution has been increased (e.g., approximately by the multiple) and is greater than the resolution of the display. Modifying the resolution preferably changes (e.g., increases, decreases, stretches, squishes, etc.) an aspect ratio of the lightfield image to match the resolution of the display. The resolution can be automatically and/or manually modified. The resolution can be modified by the display, by a computing system (e.g., a display computing system, cloud computing system, etc.), and/or otherwise be modified. However, modifying the resolution of the lightfield image can otherwise function. 5. Specific examples.

In a first example of S300, as shown in FIG. 4, generating the encoded light field image can include optionally generating a quilt image from the set of views of a light field image, arranging the set of views into an N×1 array of views, compressing the set of views as a video (e.g., using a video codec), selecting a thumbnail (e.g., key view from the light field image), and storing the video as metadata of the thumbnail.

Figure 5:
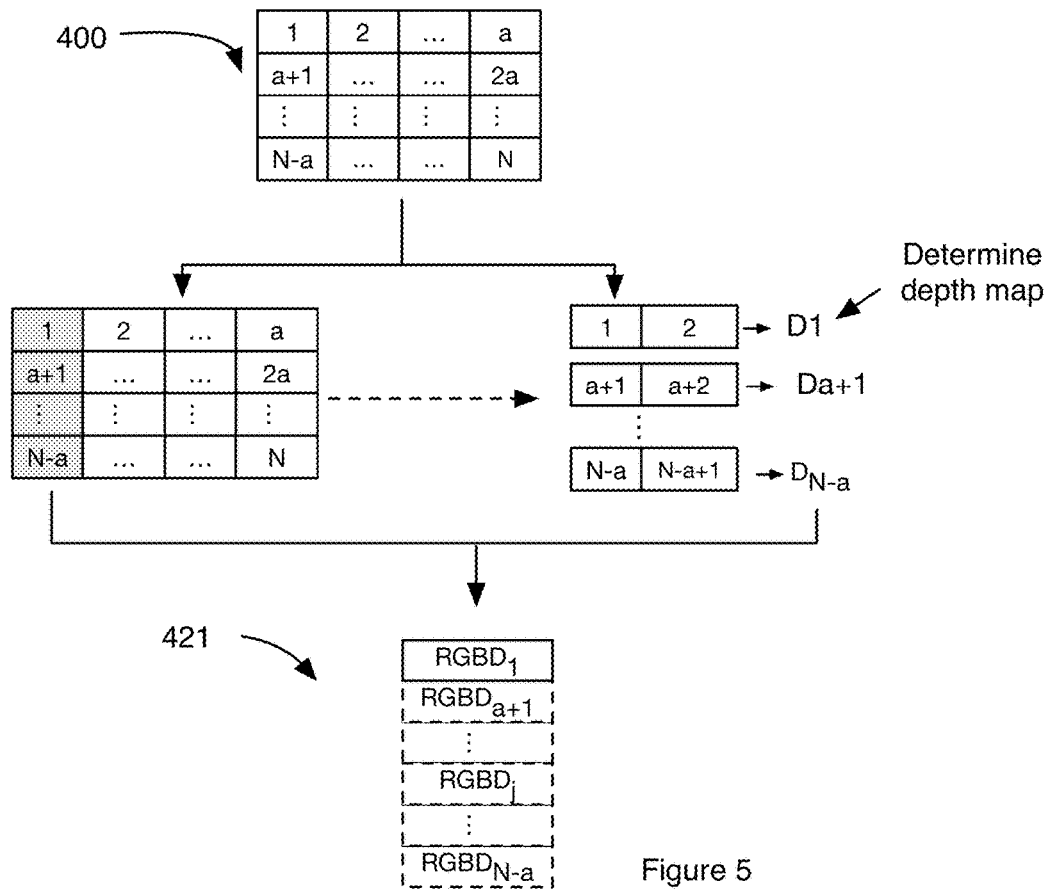
FIG. 5 is a schematic representation of an example of generating a light field image, where the light field image is stored as a depth array.

In a second example of S300, as shown in FIG. 5, S300 can include determining depth maps for a subset of the views (e.g., for every $a^{th}$ view where a is an integer) from a disparity vector determined between view a and view a+1, and storing the subset of views with their associated depth maps as a depth array.

Figure 7:
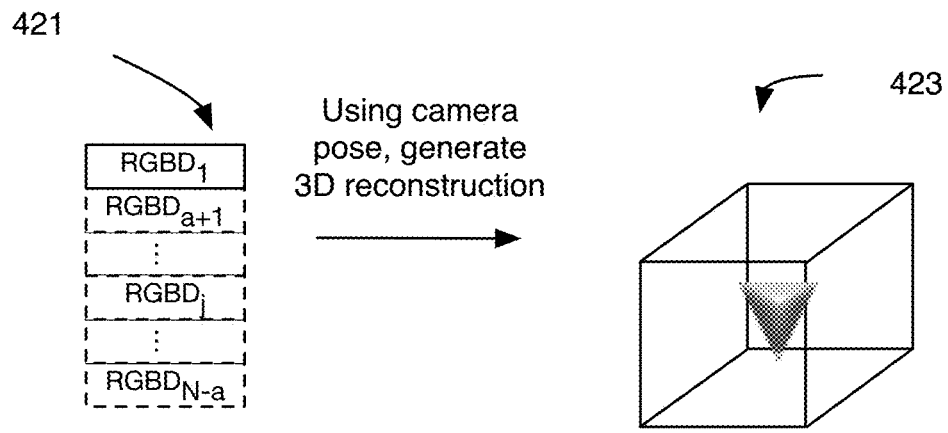
FIG. 7 is a schematic representation of an example of storing the light field image as a 3D representation of the scene.

In a third example of S300, as shown in FIG. 7, S300 can include determining depth maps for a subset of the views (e.g., for every $a^{th}$ view) from a disparity vector determined between view a and view a+1, generating a 3D reconstruction of the scene (e.g., by determining the scene geometry based on the depth maps, the scene appearance based on the views), and storing the 3D reconstruction.

In a fourth example of S300, as shown in FIG. 9, generating an encoded light field video can include arranging views for each light field image into a 1-dimensional array by populating the array with views from the light field images in a zigzag arrangement (e.g., for each even indexed view, arranging the views in ascending order from 1 to N and for each odd indexed view, arranging the views in descending order from N to 1; for each even indexed view, arranging the views in descending order from N to 1 and for each odd indexed view, arranging the views in ascending order from 1 to N; etc.), determining a set of key views (e.g., the set of views that includes the first view corresponding to each light field image, the set of views that includes the first arranged view corresponding to each light field image, etc.) and/or key light field images, appending the view order for the light field image to the metadata in the key view for the corresponding light field image, and storing the arranged views in a video.

Figure 10:
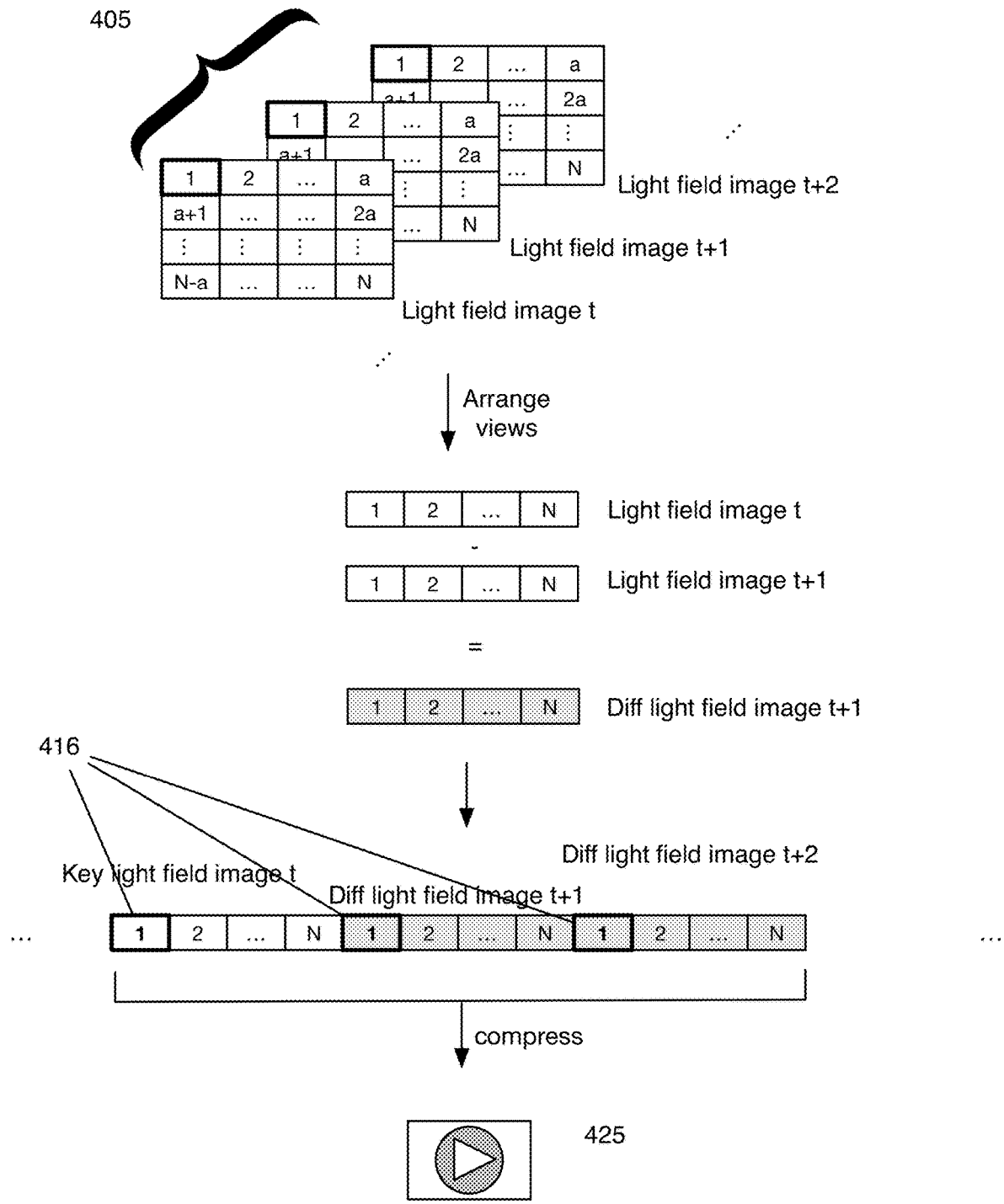
FIG. 10 is a schematic representation of an example of generating a light field video, where a subset of the light field frames of the light field video are stored as difference light field images computed relative to the preceding frame.

In a fifth example of S300, as shown in FIG. 10, generating an encoded light field video can include arranging the views for each light field image; determining a set of key light field images (e.g., every second, third, fourth, fifth, tenth, twentieth, thirtieth, fortieth, fiftieth, hundredth, etc. light field image; random light field images; light field images selected according to a ruleset; etc.); determining a set of key views from the set of key light field images (e.g., the set of views that includes the first view corresponding to each light field image, the set of views that includes the first arranged view corresponding to each light field image, etc.); appending metadata (e.g., a view order, whether the view is a key view or a difference view, etc.) to each key view; iteratively, starting with each key light field image, calculating a difference between adjacent light field images, arranging the resultant difference views (e.g., in an M×1 array), appending the difference views to the encoded light field image; and storing the encoded light field image(s) as a video (e.g., using a video codec). In a specific example, a light field video can be encoded as a 1-dimensional video including a timeseries of views. Each view from each light field image of the light field video can be included in the timeseries of views. Alternatively, each view of the timeseries of views can be a key view selected from each light field video frame, and is associated with the difference data calculated between the key view and the remaining views of the respective frame. Alternatively, each view of the 1-D video is a view from a keyframe 408 of the light field video (e.g., arranged as discussed in the first embodiment of S230), wherein each view is associated with difference data calculated between the view and one or more corresponding views (e.g., sharing the same index) from the remaining frames of the light field video (e.g., successive frames of the light field video).

Figure 17:
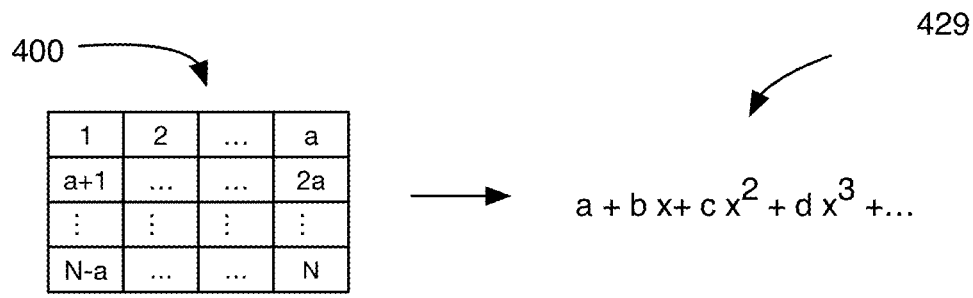
FIG. 17 is a schematic representation of an example of encoding a lightfield image as a polynomial.

In a sixth example as shown in FIG. 17, S300 can include determining a polynomial representation 429 for a lightfield image.

However, the embodiment, variants, and/or subvariants of S300 can be combined in any manner and/or S300 can be performed in any manner.

In a first specific example, decoding the encoded light field image can include: accessing metadata from a thumbnail, extracting the views from a video stored in the metadata, and generating a light field image from the extracted views. In a variant of this specific example, decoding the encoded light field image can include: (a) accessing metadata from a key view, (b) extracting the views associated with a light field image (e.g., of a light field video), (c) generating a light field image from the extracted views based on the view order (e.g., as determined from the metadata such as ascending, descending, zigzag, etc.), and repeating (a)-(c) for each subsequent light field image of the light field video.

Figure 6:
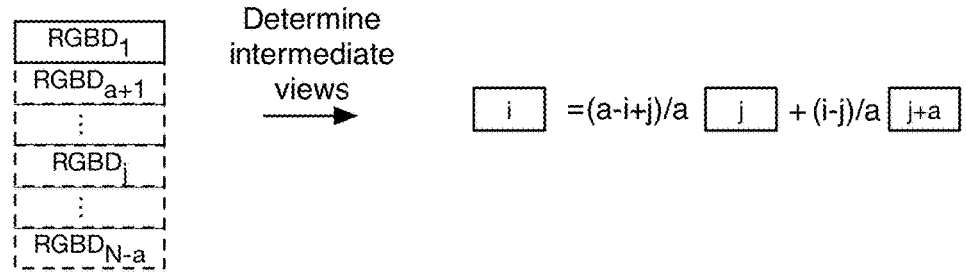
FIG. 6 is a schematic representation of an example of decoding an encoded light field image, where the encoded light field image is decoded by interpolating between views.

In a second specific example, as shown in FIG. 6, decoding the encoded light field image can include: accessing a depth array, determining correspondences between views from the depth array, generating intermediate views between the views of the depth array by interpolating between the views, and generating a light field image from the views of the depth array and the intermediate views.

Figure 8:
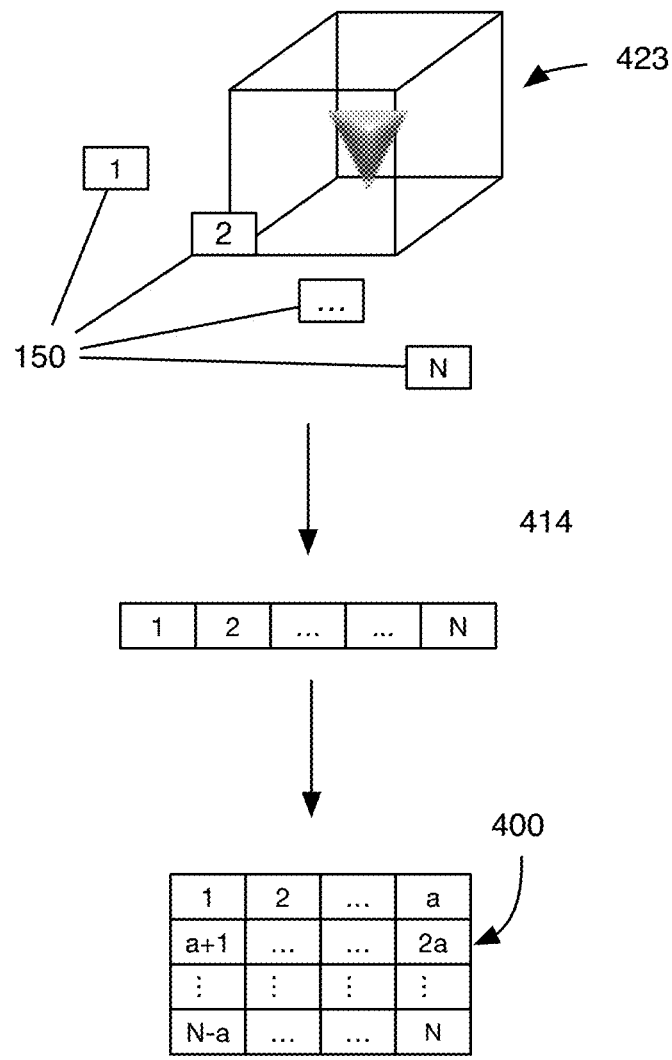
FIG. 8 is a schematic representation of an example of decoding an encoded light field image that was encoded as a 3D representation by using a set of virtual cameras to generate the light field image.

In a third specific example, as shown in FIG. 8, decoding the encoded light field image can include: accessing a 3D reconstruction, generating a virtual camera array (e.g., corresponding to a point of view, corresponding to the camera array, etc.), acquiring a set of virtual views (e.g., virtual images) of the 3D reconstruction using the virtual camera array, and generating a light field image using the set of virtual views.

Figure 11:
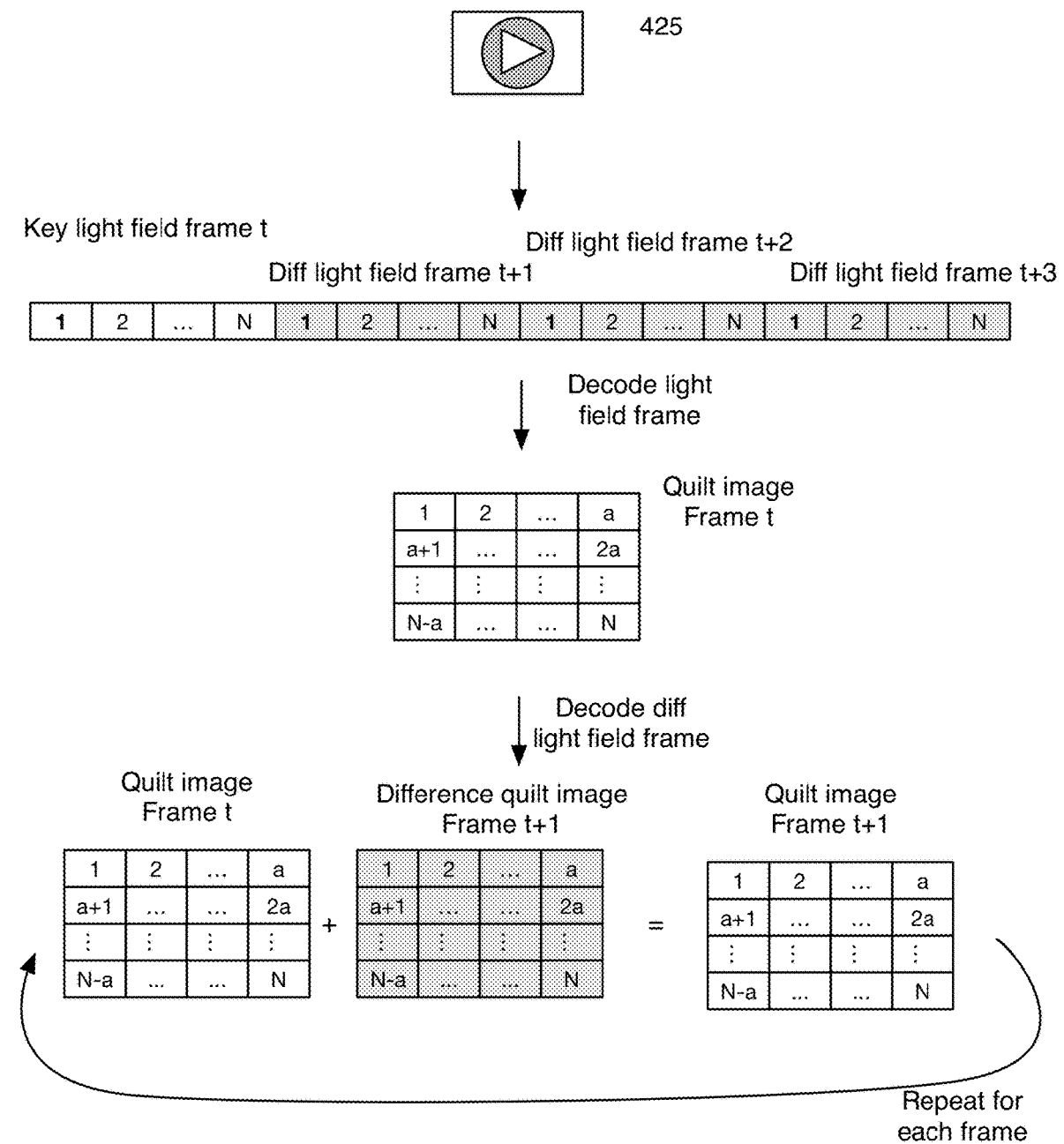
FIG. 11 is a schematic representation of an example of decoding a light field video, where the light field video is decoded by adding a difference light field image (e.g., in a quilt format) corresponding to one frame to the light field quilt image corresponding to the previous frame.

In a fourth specific example, as shown in FIG. 11, decoding the encoded light field image can include: extracting views associated with a key light field image from an encoded light field image (e.g., as identified by the metadata in a key view), arranging the extracted views in a light field image, (a) extracting difference views associated with a subsequent frame from the encoded light field image, (b) arranging the difference views into a difference light field image, (c) adding the light field image and the difference light field image to generate the subsequent light field image, repeating (a)-(c) for each difference light field image.

Figure 16:
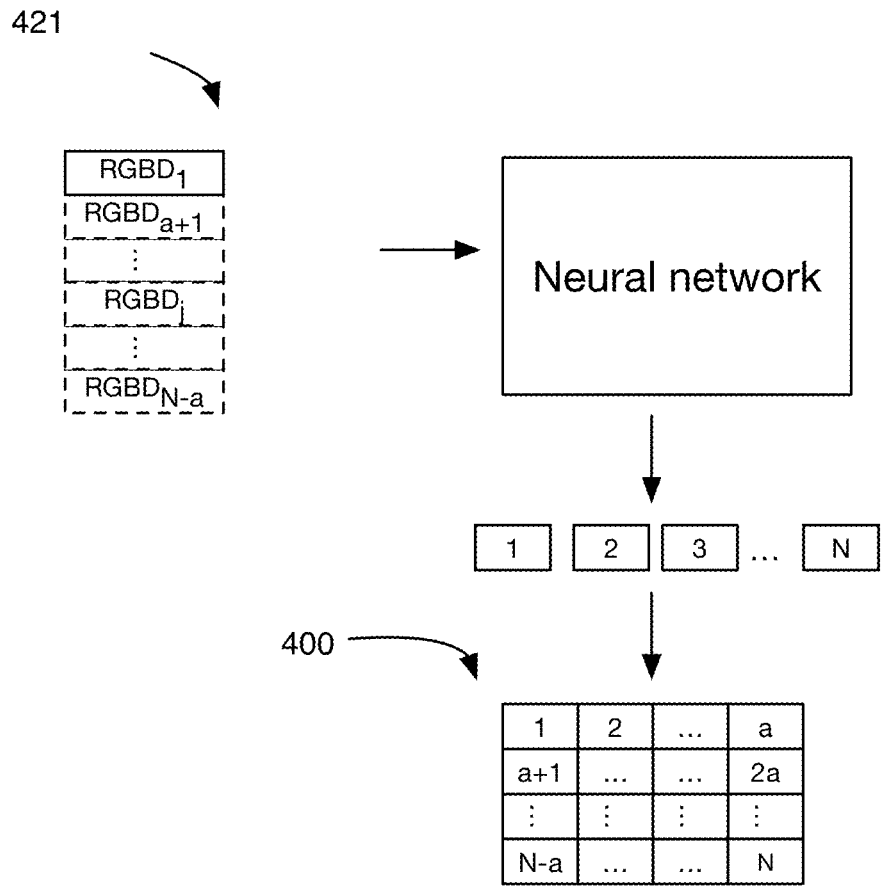
FIG. 16 is a schematic representation of an example of view synthesis or view interpolation using machine learning.

In a fifth specific example, as shown in FIG. 16, decoding the encoded light field image can include providing the encoded light field image to a neural network (e.g., using DAIN), generating views from the encoded light field image using the neural network, and optionally arranging the views in a quilt image. In this specific example, the encoded light field image can include a subset of views (e.g., 1 view, 2 views, 3 views, 4 views, 6 views, 8 views, 10 views, etc.) and optionally depth information associated with each view.

However, the different embodiments and/or variants of decoding the encoded light field image can be combined in any suitable manner and/or the encoded light field image can be decoded in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for displaying a holographic image comprising:
receiving a set of images, each image associated with a different perspective of a scene;
generating a quilt image by arranging the set of images starting with a first image associated with a first perspective and ending at a second image associated with a second perspective, wherein the set of images are arranged in a raster starting at a bottom left and rastering horizontally through views to a top right within the quilt image;
wherein the holographic image is a frame of a holographic video, wherein the holographic video is compressed by:
for each frame of the holographic video:
arranging the images of the quilt image associated with the frame in a linear array; and
appending subsequent frames to the linear array, wherein the images from each subsequent frame are ordered in an opposing order relative to a preceding frame;
compressing the linear array using a video codec;
transmitting the compressed quilt image to a display;
decompressing the compressed quilt image;
lenticularizing the decompressed quilt image based on a calibration associated with the display;
duplicating each pixel of the lenticularized quilt image at least once to generate the holographic image, wherein each duplicated pixel is immediately adjacent to the corresponding original pixel; and
displaying the holographic image using the display.

2. The method of claim 1, wherein the display is operable to concurrently display the holographic image to a plurality of viewers without using a headset.

3. The method of claim 1, wherein the compressed quilt image is transmitted using a polynomial representation.

4. The method of claim 1, wherein generating the holographic image comprises appending a first segment of the lenticularized quilt image to a second segment of the lenticularized quilt image, wherein the first segment and second segment share a predetermined number of identical pixels.

5. A method for displaying a holographic image comprising:
- receiving a set of images, each image of the set of images comprising color information and depth information, wherein each image of the set of images comprises a different perspective of a common scene;
- determining intermediate views associated with perspectives intermediate between perspectives associated with two images of the set of images;
- arranging the set of images and the intermediate views into a quilt image based on the pose of a respective source camera, wherein the set of images and the intermediate views are arranged in a raster starting at a bottom left and rastering horizontally through views to a top right within the quilt image, wherein the quilt image is a frame of a holographic video;
- compressing the quilt image by:
  - arranging the images of the quilt image associated with the frame in a linear array;
  - appending subsequent frames to the linear array, wherein the images from each subsequent frame are ordered in an opposing order relative to a preceding frame; and
  - compressing the linear array using a video codec;
- transmitting the compressed quilt image to a holographic display;
- decompressing the compressed quilt image;
- lenticularizing the decompressed quilt image based on a calibration of the holographic display to generate the holographic image, wherein the lenticularized quilt image is configured to decrease a chromatic anomaly arising from image compression present in the displayed holographic image; and
- displaying the holographic image using the holographic display.

6. The method of claim 5, wherein the holographic display is operable to concurrently display the holographic image to a plurality of viewers without using a headset.

7. The method of claim 5, wherein the compressed quilt image is transmitted using a polynomial representation.

8. The method of claim 5, wherein the quilt image is lenticularized at a remote server.

9. The method of claim 5, wherein the set of images comprises fewer images than the quilt image.

10. The method of claim 5, wherein the depth information is determined based on a depth map calculated using two images of the set of images.

11. The method of claim 5, wherein the quilt image comprises the set of images arranged in a predetermined order starting with an image associated with a first extreme perspective and ending at a second image associated with a second extreme perspective.

12. The method of claim 5, wherein determining an intermediate view comprises projecting a first image from the set of images to a perspective associated with the intermediate view based on the difference in perspective between the first image and the intermediate view.

13. The method of claim 12, further comprising projecting a second image from the set of images to the perspective associated with the intermediate view.

14. The method of claim 13, further comprising repeating projecting the first image and the second image to the perspective associated with the intermediate view after the intermediate view has been determined.

\* \* \* \* \*